(12) United States Patent
Suzuki et al.

(10) Patent No.: US 7,619,385 B2
(45) Date of Patent: Nov. 17, 2009

(54) MOTOR CONTROLLER, WASHING MACHINE, AIR CONDITIONER AND ELECTRIC OIL PUMP

(75) Inventors: Takahiro Suzuki, Tokai (JP); Tsunehiro Endo, Hitachiota (JP); Kazuaki Tobari, Hitachiota (JP); Daigo Kaneko, Hitachi (JP); Daisuke Maeda, Hitachi (JP); Akira Yamazaki, Hitachi (JP)

(73) Assignees: Hitachi, Ltd., Tokyo (JP); Hitachi Industrial Equipment Systems, Co., Ltd., Tokyo (JP); Hitachi Car Engineering Co., Ltd., Ibaraki-ken (JP)

( * ) Notice: Subject to any disclaimer, the term of this patent is extended or adjusted under 35 U.S.C. 154(b) by 650 days.

(21) Appl. No.: 11/494,601

(22) Filed: Jul. 28, 2006

(65) Prior Publication Data

US 2007/0024232 A1 Feb. 1, 2007

(30) Foreign Application Priority Data

Jul. 29, 2005 (JP) ............................. 2005-219867

(51) Int. Cl.
H02P 6/08 (2006.01)
(52) U.S. Cl. ............. 318/705; 318/400.11; 318/400.02; 318/779; 318/721
(58) Field of Classification Search ................. 318/560, 318/568.18, 599, 609, 651, 652, 59, 61, 700, 318/400.01–400.03, 400.11, 705, 715, 721, 318/778, 779, 799, 805, 808–810, 812
See application file for complete search history.

(56) References Cited

U.S. PATENT DOCUMENTS

| 4,565,957 | A | * | 1/1986 | Gary et al. | .................. 318/723 |
| 5,581,168 | A | * | 12/1996 | Rozman et al. | ............. 318/723 |
| 5,834,911 | A | * | 11/1998 | Kimura | ................. 318/400.11 |
| 6,184,647 | B1 | * | 2/2001 | Oguro et al. | ................ 318/727 |
| 6,208,109 | B1 | * | 3/2001 | Yamai et al. | ................ 318/716 |
| 6,483,270 | B1 | | 11/2002 | Miyazaki et al. | |
| 6,628,893 | B2 | * | 9/2003 | Ohno et al. | ................. 388/800 |
| 6,965,212 | B1 | * | 11/2005 | Wang et al. | ................. 318/700 |
| 7,095,204 | B2 | * | 8/2006 | Lee et al. | .................... 318/700 |
| 2001/0017529 | A1 | * | 8/2001 | Nozari | ....................... 318/808 |

FOREIGN PATENT DOCUMENTS

| CN | 1274481 A | 11/2000 |
| JP | 2004-222382 | 8/2004 |

* cited by examiner

*Primary Examiner*—Walter Benson
*Assistant Examiner*—Eduardo Colon-Santana
(74) *Attorney, Agent, or Firm*—Antonelli, Terry, Stout & Kraus, LLP.

(57) ABSTRACT

A motor controller capable of suppressing a large speed change generated at the time of changeover from a synchronous operation mode to a position feedback operation mode and implementing even acceleration characteristics regardless of the load torque by estimating a torque of a permanent magnet motor in the synchronous operation mode for driving the permanent magnet motor and setting an initial value of a current command value in a position sensor-less operation mode on the basis of information of the torque estimated value.

19 Claims, 18 Drawing Sheets

MOTOR CONTROLLER, WASHING MACHINE, AIR CONDITIONER AND ELECTRIC OIL PUMP

BACKGROUND OF THE INVENTION

The present invention relates to a motor controller for stably driving a permanent magnet motor.

For starting a permanent magnet motor, the following method is known. The method includes the steps of:

letting a current flow through a specific phase and positioning a rotor, as a positioning mode;

then driving a synchronous motor without using information of a rotational angle position of the permanent magnet motor (without conducting position feedback), raising the output frequency of an inverter gradually, and accelerating the permanent magnet motor to a certain number of rotations from the positioning state, as a synchronous operation mode; and then conduct operation at that number of rotations or above by using an estimated value of a magnetic pole position or information of the rotational angle position obtained from a magnetic pole position sensor or the like, as a position feedback operation mode.

When changing over the operation mode at the above-described certain number of rotations in this method, a virtual rotation position based on which a control system is generated in the synchronous operation mode state might differ from an actual rotor position remarkably or continuity of the motor output torque might not be kept between before and after the changeover. In such a case, the number of rotations might become abnormally high immediately after the changeover, or conversely abnormally low. A changeover shock involving a remarkable change in the number of rotations is thus caused. The degree of changeover shock varies depending upon the changeover method and the load condition at the time of changeover.

As one of other shocks caused when the operation mode is changed over, there is a problem of a peak current involving a current increase. As for a technique for suppressing the peak current to a low value, there is a method described in, for example, JP-A-2004-222382. As a method for determining a voltage in a synchronous operation mode in this conventional technique, a load torque is estimated on the basis of a relation that a current flowing through the permanent magnet motor decreases as the load torque increases, and a voltage corresponding to the estimated load torque is applied to the permanent magnet motor. Thereafter, changeover to a mode using information of the rotational angle position is conducted, when phase differences between three-phase phases and the rotational angle position are within a prescribed phase difference range.

SUMMARY OF THE INVENTION

According to the above-described conventional technique, a change of the load torque is estimated in the synchronous operation mode on the basis of a change of the current flowing into the permanent magnet motor, in order to determine the voltage. On the other hand, operation mode changeover is conducted when the phase differences between the three-phase phases and the rotational angle position have entered the prescribed phase difference range. A method for using the load torque estimated in the synchronous operation mode at the time of changeover is not described in JP-A-2004-222382. In addition, a countermeasure against a large speed variation after the changeover is not described in JP-A-2004-222382.

An object of the present invention is to implement even acceleration characteristics regardless of the load torque by suppressing a large speed change generated when changeover from the synchronous operation mode to the position feedback operation mode is conducted.

In accordance with one aspect of the present invention, there is provided a motor controller including current regulators supplied with current command values, a voltage command value generator supplied with outputs of the current regulators, and a power conversion circuit for applying a voltage to a permanent magnet motor in accordance with an output of said voltage command value generator, wherein the motor controller has a synchronous operation mode in which position feedback is not conducted, the motor controller has an operation mode using position feedback, and in the synchronous operation mode, an arithmetic operation for estimating a value proportionate to a torque of the permanent magnet motor is conducted, a control constant concerning an automatic speed regulator, the current regulators or the voltage command value generator is set on the basis of the value proportionate to the torque of the permanent magnet motor, and a shift to the operation mode using position feedback is conducted.

Other features of the present invention are prescribed in Claims.

According to the present invention, it becomes possible to suppress a large speed change generated when changeover from the synchronous operation mode to the position feedback operation mode is conducted.

Other objects, features and advantages of the invention will become apparent from the following description of the embodiments of the invention taken in conjunction with the accompanying drawings.

DESCRIPTION OF THE EMBODIMENTS

In the present embodiment, in order to conduct position sensor-less control on the basis of a motor voltage command and motor current information, position information in the feedback operation mode is basis on control in a dc-qc control rotation coordinate system for control including a dc-axis for control, which represents a virtual rotor position, and a qc-axis for control, which leads the dc-axis for control by 90 degrees in the rotation direction with respect to a d-q actual rotation coordinate system including a d-axis, which represents a position of the rotor in the permanent magnet motor in a magnetic flux direction, and a q-axis, which leads the d-axis by 90 degrees in a rotation direction. The present embodiment is based on control in the dc-qc control rotation coordinate system. In the ensuing description, the dc-qc coordinate axes are simply referred to as control axes.

In the ensuing description, it is assumed that the permanent magnet motor is a motor of non-salient pole type and a reluctance torque is not generated.

First Embodiment

Hereafter, an embodiment of the present invention will be described in detail with reference to the drawings.

Figure 1:
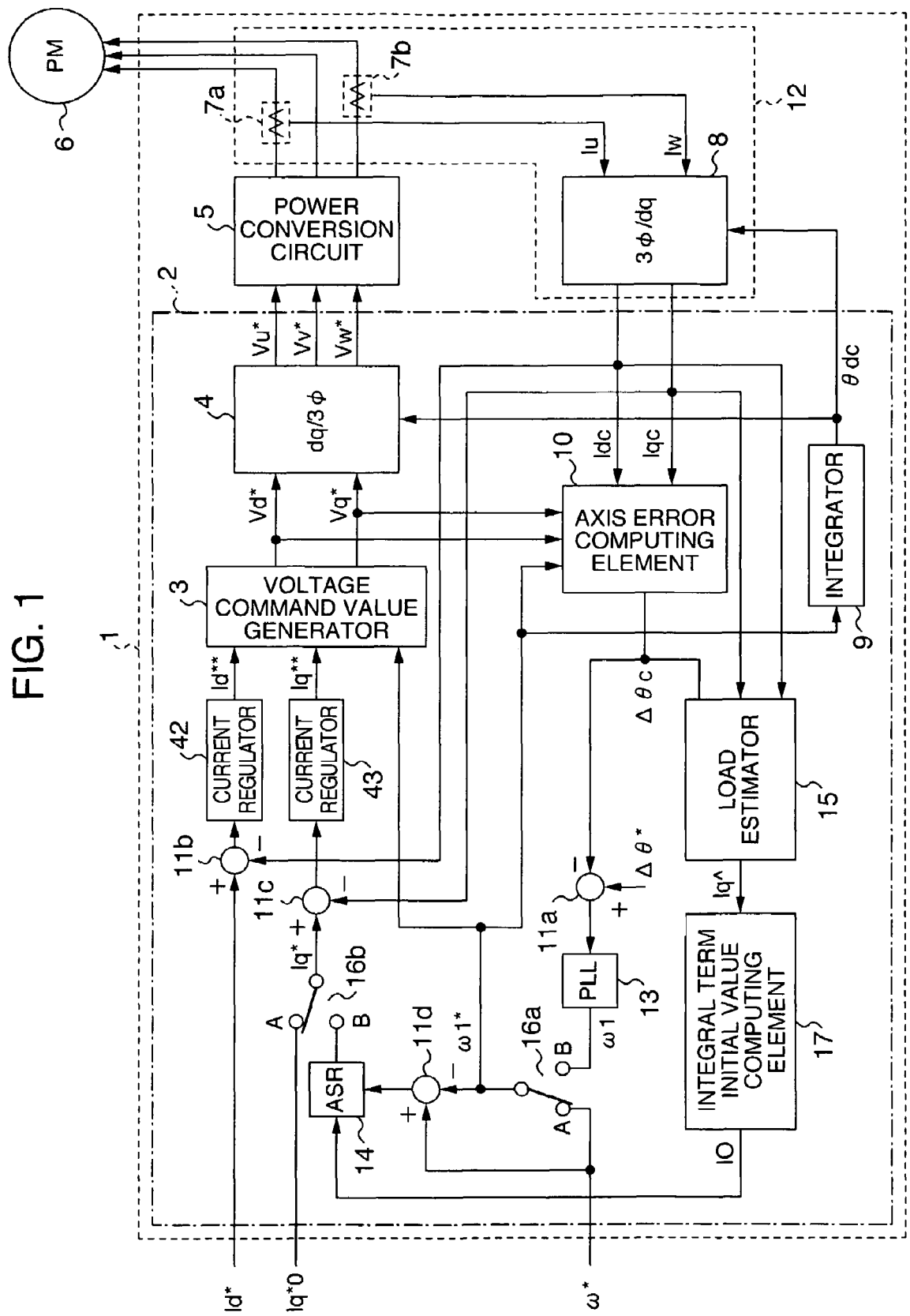
FIG. 1 is a general configuration diagram of a motor controller according to an embodiment of the present invention.

FIG. 1 is a basic configuration diagram of a motor controller according to the present invention. When broadly divided, a motor controller 1 includes a current detector 12, a control unit 2 for receiving a d-axis detected current Idc and a q-axis detected current Iqc output from the current detector 12, conducting arithmetic operation, and outputting three-phase voltage command values (Vu*, Vv*, Vw*) to be finally applied to a permanent magnet motor (PM) 6, and a power conversion circuit 5 for applying voltages according to the three-phase voltage command values (Vu*, Vv*, Vw*) to the permanent magnet motor 6.

The current detector 12 includes motor current detectors (7a and 7b) for detecting currents Iu and Iw respectively flowing through the U-phase and W-phase included in three-phase AC currents flowing through the motor, and a 3Ø/dq converter 8 for conducting coordinate conversion from three-phase axes to control axes on the detected motor currents by using an estimated magnetic pole position θdc and finding a d-axis detected current Idc and a q-axis detected current Iqc.

Figure 2:
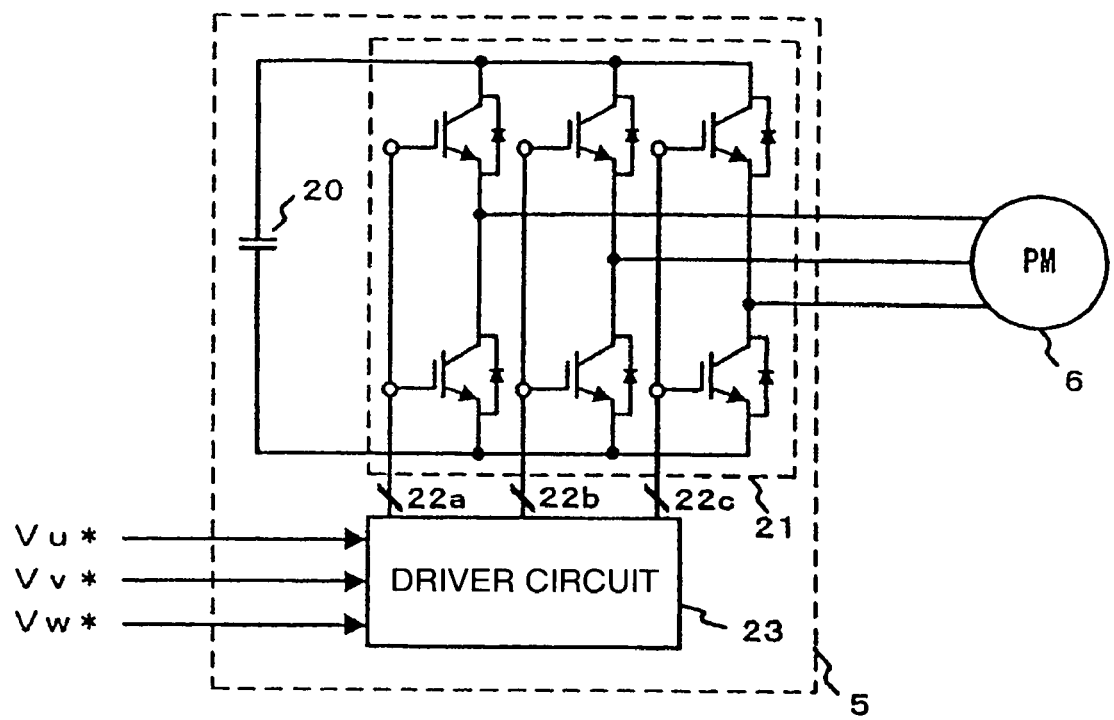
FIG. 2 shows a configuration example of a power conversion circuit.

As shown in FIG. 2, the power conversion circuit 5 includes an inverter 21, a DC voltage source 20, and a driver circuit 23. The inverter 21 includes semiconductor elements such as IGBTs (Insulated Gate Bipolar Transistors) and power MOSFETs (Metal Oxide Semiconductor Field Effect Transistors). These semiconductors are upper and lower arms for the U phase, V phase and W phase. Nodes between upper and lower arms are connected to the permanent magnet motor 6. The inverter 21 conducts switching operation according to pulsative PWM pulse signals (22a, 22b and 22c) output from the driver circuit 23. An AC voltage having an arbitrary frequency is applied to the permanent magnet motor 6 by switching the DC voltage source 20 to drive the motor.

The control unit 2 includes the following components. An axis error computing element 10 receives the d-axis detected current Idc, the q-axis detected current Iqc, a d-axis voltage command value Vd* and a q-axis voltage command value Vq* and conducts computation to find a position error (axis error Δθc) between an actual rotation position (actual rotation coordinate axis) of the rotor in the permanent magnet motor 6 and a virtual rotation position (control axis). A PLL controller 13 adjusts an inverter frequency command value ω1* so as to make a difference between the axis error Δθc and an axis error command value Δθ* (typically zero) found by a subtracter 11a equal to zero. Control changeover switches (16a and 16b) conducts changeover among a positioning mode, a synchronous operation mode, and a position sensor-less mode described later. An automatic speed regulator (ASR) 14 includes a proportional computing element and an integration computing element to adjust a q-axis current command value (Iq*) so as to make a difference between a frequency command value ω* and an inverter frequency command value ω1* found by a subtracter 11d equal to zero in the position sensor-less mode. A load estimator 15 finds a q-axis current estimated value Iq^ in the synchronous operation mode by using the d-axis detected current Idc, the q-axis detected current Iqc, and the axis error Δθc. An integral term initial value computing element 17 conducts computation to find an integral term initial value I0 for the integral computing element in the automatic speed regulator 14 on the basis of the q-axis current estimated value Iq^. Current regulators 42 and 43 adjust second current command values (Id and Iq) so as to make a difference between a d-axis current command value Id* and the d-axis detected current Idc found by a subtracter 11b and a difference between the q-axis current command value Iq* and the q-axis detected current Iqc found by a subtracter 11c equal to zero, respectively. A voltage command value generator 3 conducts vector computation by using Id, Iq and the inverter frequency command value ω1*, and outputs Vd* and Vq*. A dq/3Ø converter 4 conducts coordinate conversion from the control axes to the three-phase axes on the Vd* and Vq*, and outputs the three-phase voltage command values (Vu*, Vv*, Vw*) to be applied to the permanent magnet motor 6. An integrator 9 integrates the inverter frequency command value ω1*, and outputs the estimated magnetic pole position θdc.

Most components in the control unit 2 are formed of semiconductor integrated circuits (computing control means) such as microcomputers and DSPs (Digital Signal Processors).

Respective components included in the control unit 2 will now be described.

The voltage command value generator 3 conducts vector computation by using the second current command values (Id and Iq) of the d-axis and q-axis, the inverter frequency command value ω1*, and motor constants as represented by the following expression, and outputs Vd* and Vq*.

$$Vd^* = R \times Id^{**} - \omega 1^* \times Lq \times Iq^{**}$$

$$Vq^* = R \times Iq^{**} + \omega 1^* \times Ld \times Id^{**} + \omega 1^* \times K\theta \quad \text{(expression 1)}$$

In the (expression 1), R is a resistance value of a primary winding of the permanent magnet motor 6, Ld is d-axis inductance, Lq is q-axis inductance, and Ke is an induced voltage constant.

The axis error computing element 10 calculates the axis error Δθc by using the d-axis detected current Idc, the q-axis detected current Iqc, and Vd* and Vq* supplied from the voltage command value generator 3. In the subtracter 11a, the axis error Δθc is subtracted from the preset axis error command value Δθ* (typically zero). A resultant value (difference) is subjected to proportional integral control in the PLL controller 13, and consequently a detected frequency ω1 is obtained. In the position sensor-less mode described later, the detected frequency ω1 is used as the inverter frequency command value ω1* and integrated by the integrator 9. As a result, the magnetic pole position of the permanent magnet motor 6 can be estimated. The estimated magnetic pole position θdc obtained by the estimation is input to the dq/3Ø converter 4 and the 3Ø/dq converter 8 and used for arithmetic operation in each of the converters.

In other words, the control unit 2 in the present embodiment calculates the axis error Δθc between the actual rotational coordinate axis and the control axis of the rotor in the permanent magnet motor 6, corrects the inverter frequency command value ω1* by using the PLL (Phase Locked Loop) method so as to make the calculated axis error Δθc equal to zero, i.e., make the control axis the same as the actual rotational coordinate axis of the rotor in the permanent magnet motor 6, and estimates the magnetic pole position.

Figure 3:
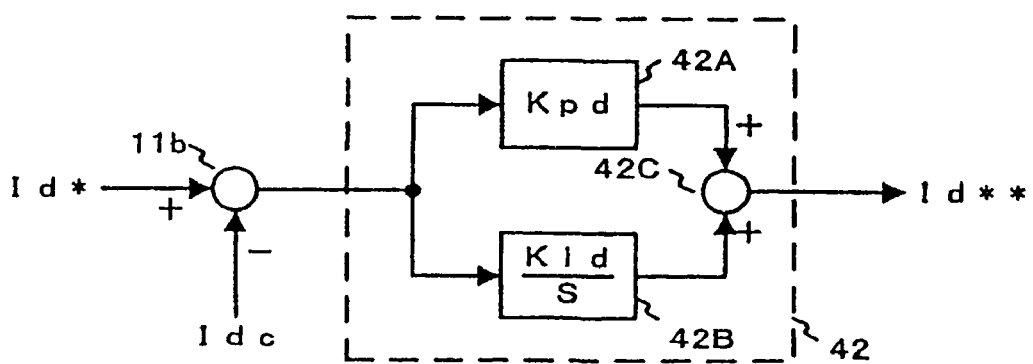
FIG. 3 shows an example of a d-axis current regulator.

Configurations of the current regulators 42 and 43 will now be described. FIG. 3 shows a configuration of the d-axis current regulator 42. The difference between the d-axis current command value Id* supplied from a high rank apparatus or the like and the d-axis detected current value Idc is found by the subtracter 11b. A proportional computing element 42A multiplies the difference by a proportionality gain Kpd. An integral computing element 42B multiplies the difference by an integral gain Kid and conducts integral processing. An output signal of the proportional computing element 42A and an output signal of the integral computing element 42B are added up. As a result, the second d-axis current command value Id** represented by the following expression is output.

$$Id^{**} = (Id^* - Idc) \times (Kpd + Kid/S) \quad \text{(expression 2)}$$

Figure 4:
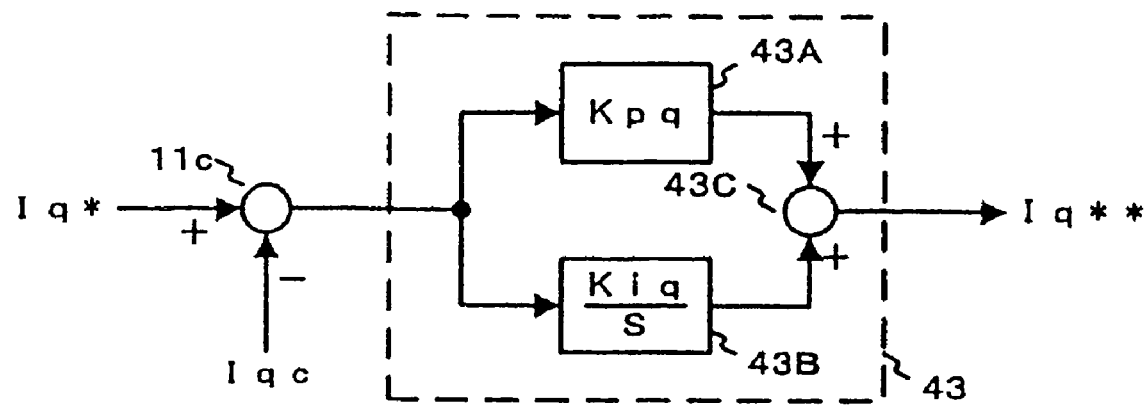
FIG. 4 shows an example of a q-axis current regulator.

FIG. 4 shows a configuration of the q-axis current regulator 43. The difference between the q-axis current command value Iq* supplied from a host apparatus or the like or supplied from the automatic speed regulator 14 and the q-axis detected current value Iqc is found by the subtracter 11c. A proportional computing element 43A multiplies the difference by a proportionality gain Kpq. An integral computing element 43B multiplies the difference by an integral gain Kiq and conducts integral processing. An output signal of the proportional computing element 43A and an output signal of the integral computing element 43B are added up. As a result, the second q-axis current command value Iq** represented by the following expression is output.

$$Iq^{**} = (Iq^* - Iqc) \times (Kpq + Kiq/S) \quad \text{(expression 3)}$$

Figure 5:
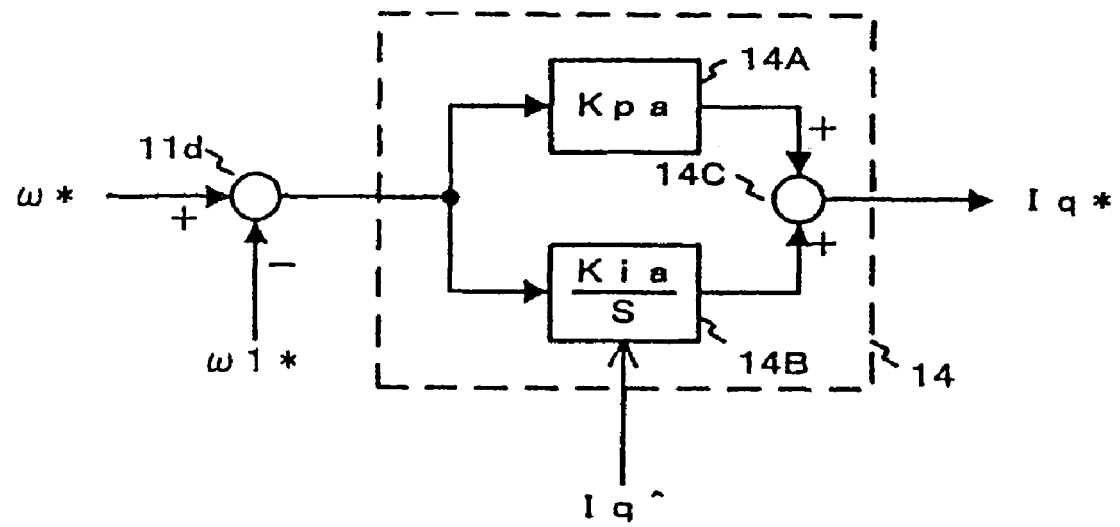
FIG. 5 shows an example of an automatic speed regulator.

Finally, FIG. 5 shows a configuration of the automatic speed regulator 14. If the control changeover switch 16a is connected to a B side, the difference between the frequency command value ω* supplied from a high rank apparatus or the like and the inverter frequency command value ω1* supplied from the PLL is found by the subtracter 11d. A proportional computing element 14A multiplies the difference by a proportionality gain Kpa. An integral computing element 14B multiplies the difference by an integral gain Kia and conducts integral processing. An output signal of the proportional computing element 14A and an output signal of the integral computing element 14B are added up. As a result, the q-axis current command value Iq* represented by the following expression is output.

$$Iq^* = (\omega^* - \omega 1^*) \times (Kda + Kia/S) \quad \text{(expression 4)}$$

Here, the integral term initial value I0 for the integral computing element at the time when the control changeover switch 16a is changed over to the B side serves as an important control constant in the present invention. Hereafter, details will be described.

Figure 6:
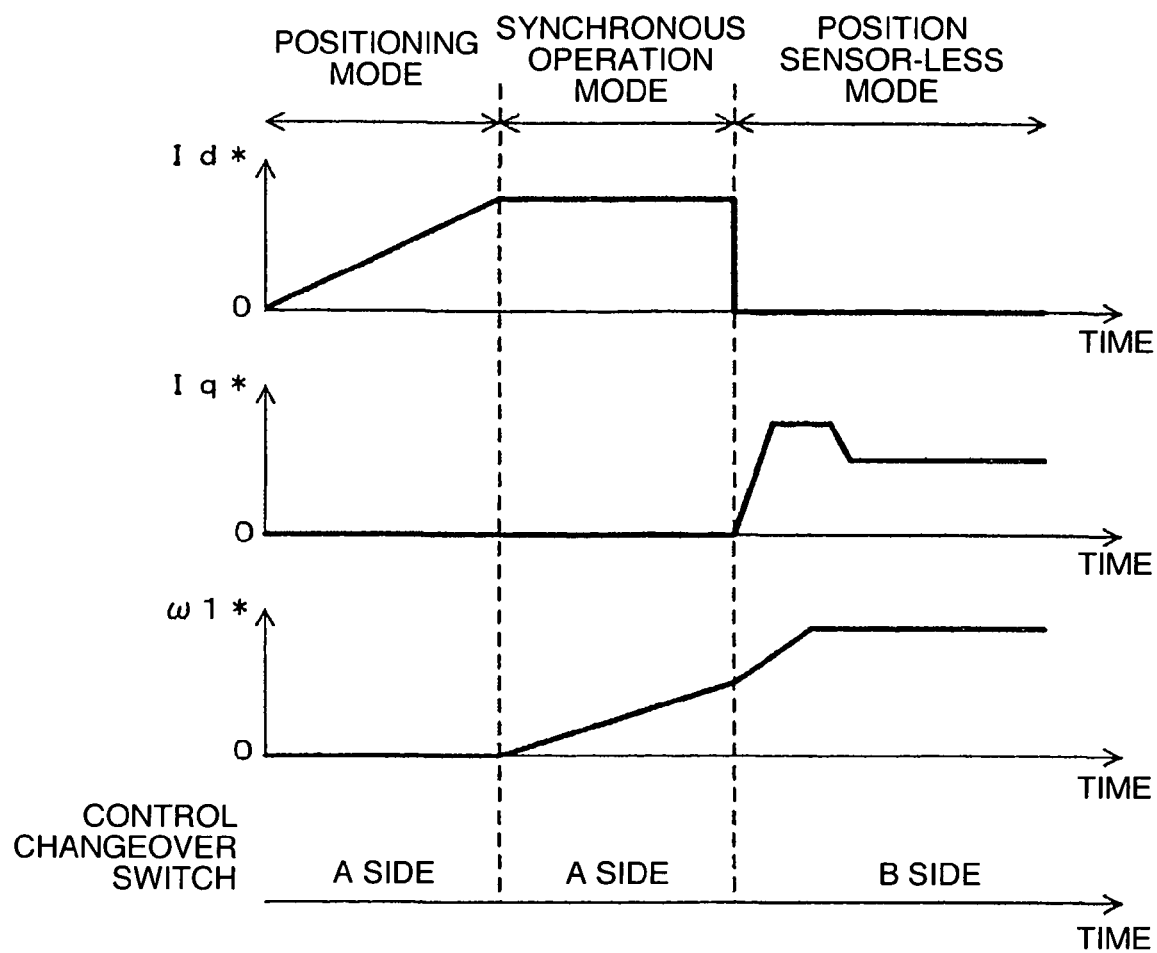
FIG. 6 shows an example of a simplified diagram for explaining transitions to respective operation modes and their features.

A basic operation conducted when starting the permanent magnet motor 6 will now be described. FIG. 6 is a simplified diagram showing transition among operation modes caused when starting the permanent magnet motor 6. There are three operation modes. In the positioning mode, a DC current is gradually let flow through a motor winding of an arbitrary phase and thereby the rotor in the permanent magnet motor 6 is fixed in a certain position. In the synchronous operation mode, voltages applied to the permanent magnet motor 6 are determined on the basis of the d-axis current command value Id*, the q-axis current command value Iq*, and the frequency command value ω*. In the position sensor-less mode, the inverter frequency command value ω1* is adjusted so as to make the axis error Δθc equal to zero.

Among these operation modes, transition to another operation mode is conducted by changing some of the d-axis current command value Id*, the q-axis current command value Iq*, and the inverter frequency command value ω1* or changing over the control changeover switches (16a and 16b) in the control unit 2. Unless stated otherwise, the two changeover switches (16a and 16b) are changed over simultaneously.

In the positioning mode, the control changeover switches (16a and 16b) are set to the A side. In other words, the frequency command ω* becomes the inverter frequency command value ω1* as it is, and a q-axis current command value Iq*0 supplied from a high rank controller or the like becomes Iq* as it is. The inverter frequency command value ω1* is set equal to zero in order to let flow a direct current through the permanent magnet motor 6.

After the positioning mode is finished, transition to the synchronous operation mode is conducted. The control changeover switches (16a and 16b) remain on the A side. In the synchronous operation mode, the d-axis current command value Id* is kept at a constant value (this start method is referred to as Id start) and the inverter frequency command value ω1* is increased. As a result, the permanent magnet motor 6 is accelerated so as to follow the inverter frequency command value ω1*.

When a frequency making position sensor-less possible is reached, the control changeover switches (16a and 16b) are changed over to the B side to conduct transition to the position sensor-less mode. As a result, the PLL controller 13 adjusts the frequency command value so as to make the difference between the axis error Δθc and the axis error command value Δθ* (typically zero) equal to zero. In addition, the automatic speed regulator 14 adjusts the q-axis current command value (Iq*) so as to make the difference between the frequency command value ω* and the inverter frequency command value ω1* equal to zero. The Iq* becomes a value corresponding to the acceleration torque and the load torque, and the permanent magnet motor 6 is accelerated. Thereafter, if the acceleration is finished and a constant speed is reached, Iq* becomes constant with a value corresponding to the load torque. Since the permanent magnet motor is the non-salient type, the d-axis current command value Id* is kept at zero over duration of the position sensor-less mode.

As a matter of fact, changes occur in the simplified diagram shown in FIG. 6 according to the load of the permanent magnet motor 6 and response frequencies of the PLL controller 13, the current regulators 42 and 43, and the automatic speed regulator 14.

Figure 7:
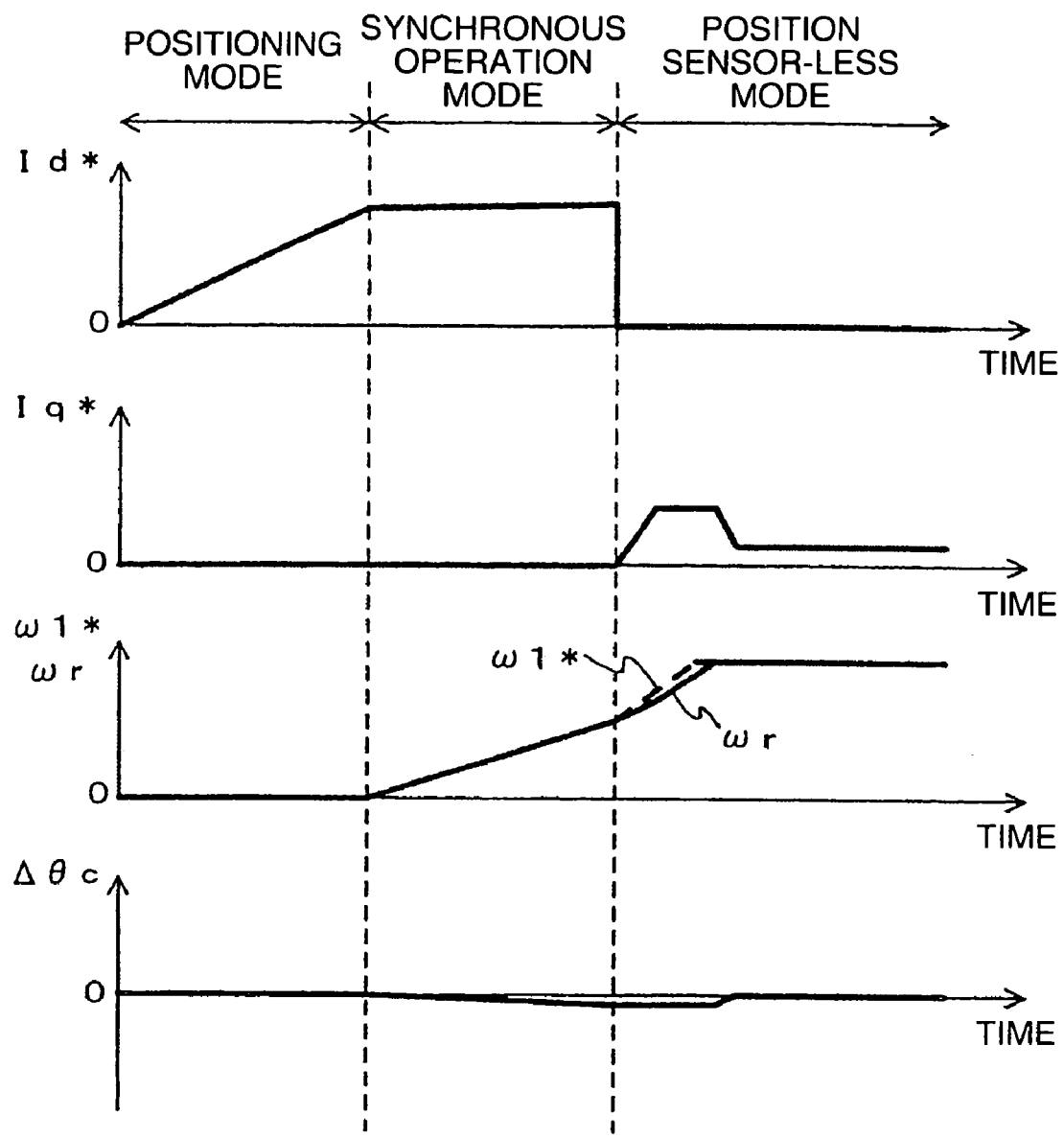
FIG. 7 shows an example of a test result obtained at the time of a light load in the case where an initial value of ASR is set to zero.
Figure 8:
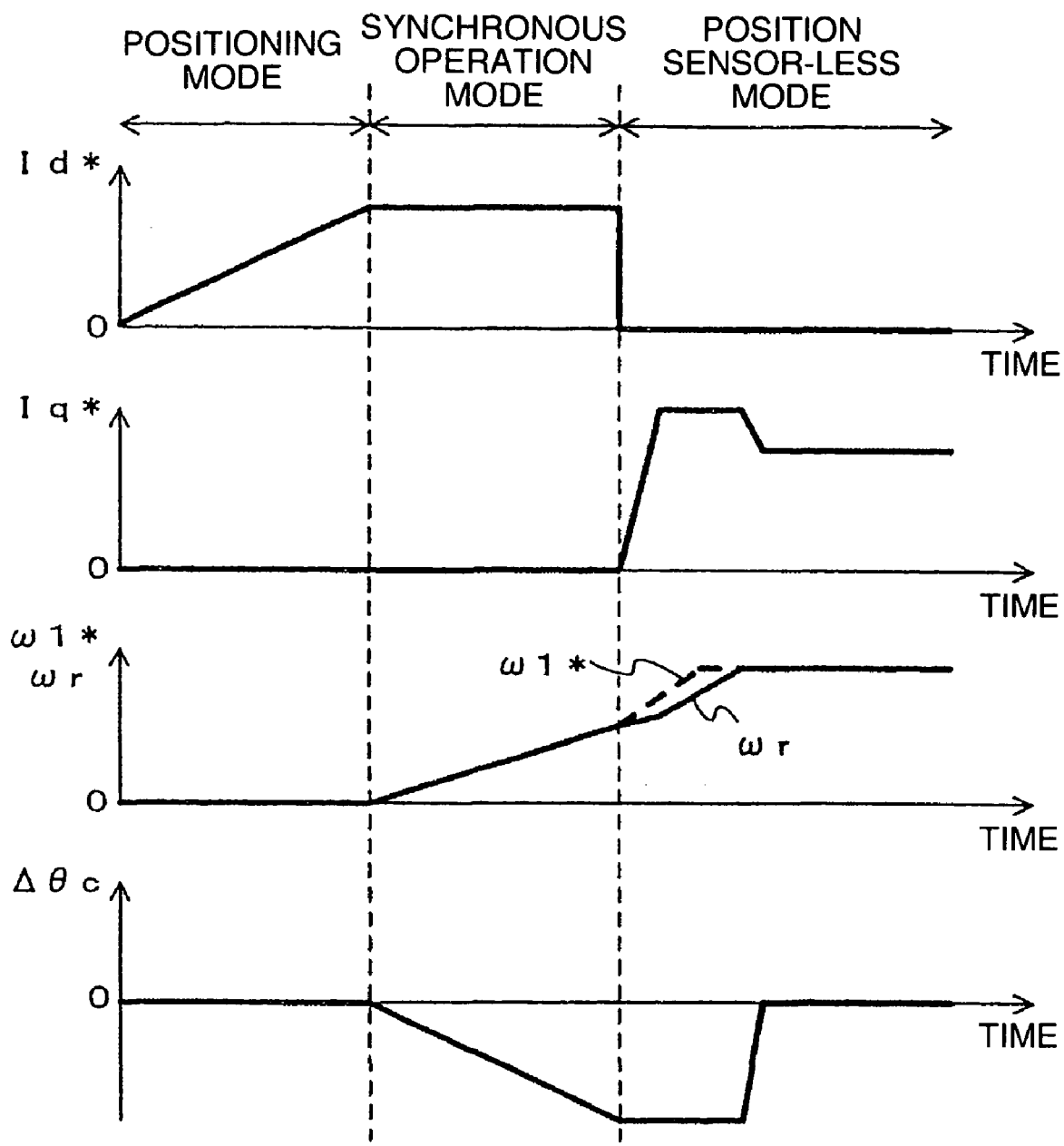
FIG. 8 shows an example of a test result obtained at the time of a heavy load in the case where an initial value of ASR is set to zero.

FIGS. 7 and 8 show changes of the command values, an actual rotational frequency ωr of the permanent magnet motor 6, and the axis error Δθc obtained when the response frequencies of the respective regulators are constant and the load of the permanent magnet motor 6 has changed. FIG. 7 shows the case of a light load, whereas FIG. 8 shows the case of a heavy load.

Changes of the axis error Δθc and the rotational frequency ωr should be given attention in FIGS. 7 and 8. At the time of the light load (FIG. 7), the axis error Δθc is approximately zero and the rotational frequency ωr also nearly follows the inverter frequency command value ω1*. At the time of the heavy load (FIG. 8), however, the axis error Δθc already assumes a large negative value in the synchronous operation mode, and the rotational frequency ωr follows the inverter frequency command-value w1* with a delay. This is because the integral term initial value I0 for the automatic speed regulator 14 is zero and there is a time delay until Iq* reaches the value corresponding to the acceleration torque and the load torque. If the axis error Δθc is large, the permanent magnet motor 6 steps out and stops in some cases.

Figure 9:
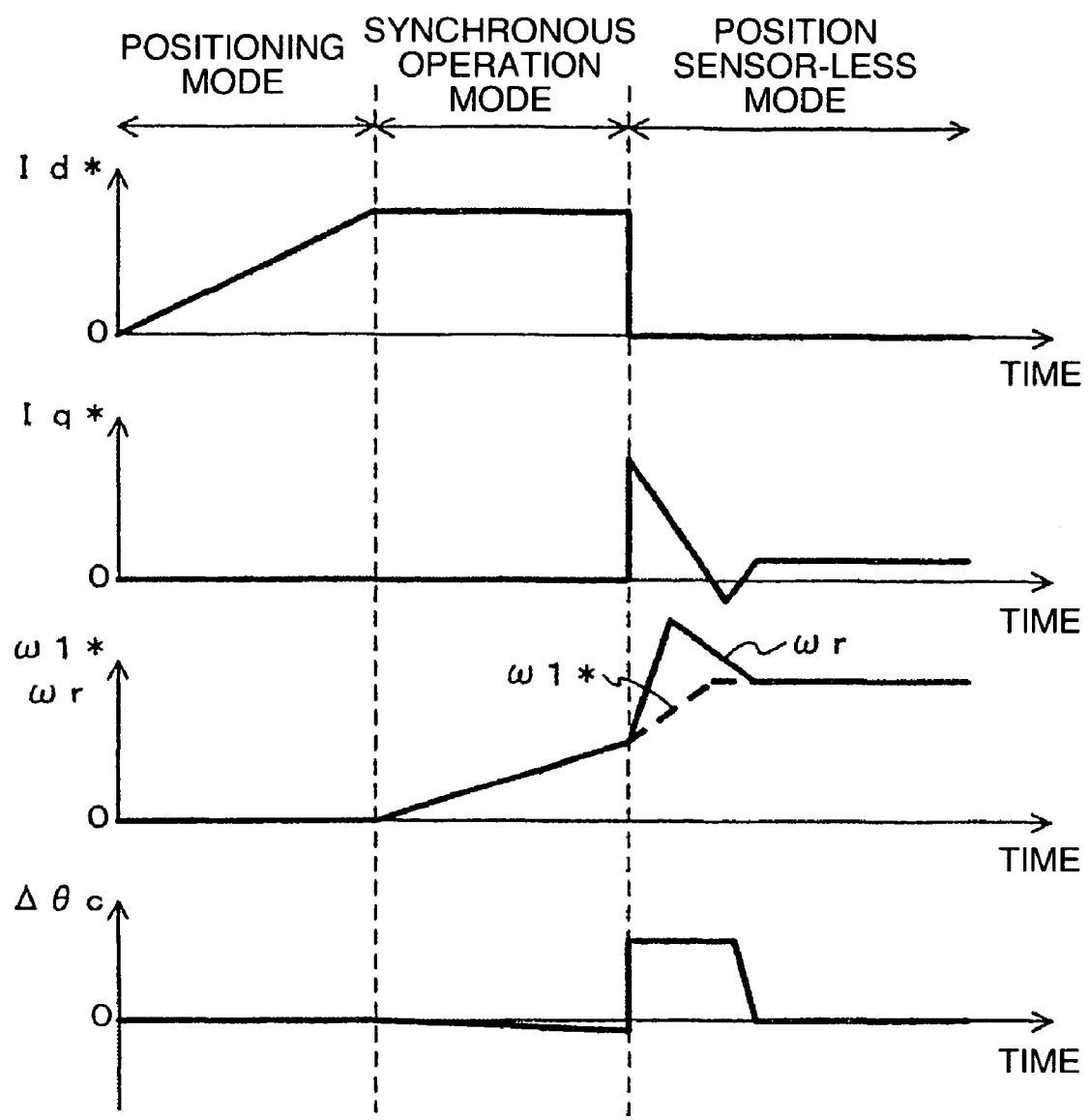
FIG. 9 shows an example of a test result obtained at the time of a light load in the case where an initial value of ASR is set to a value corresponding to an acceleration torque and a load torque.
Figure 10:
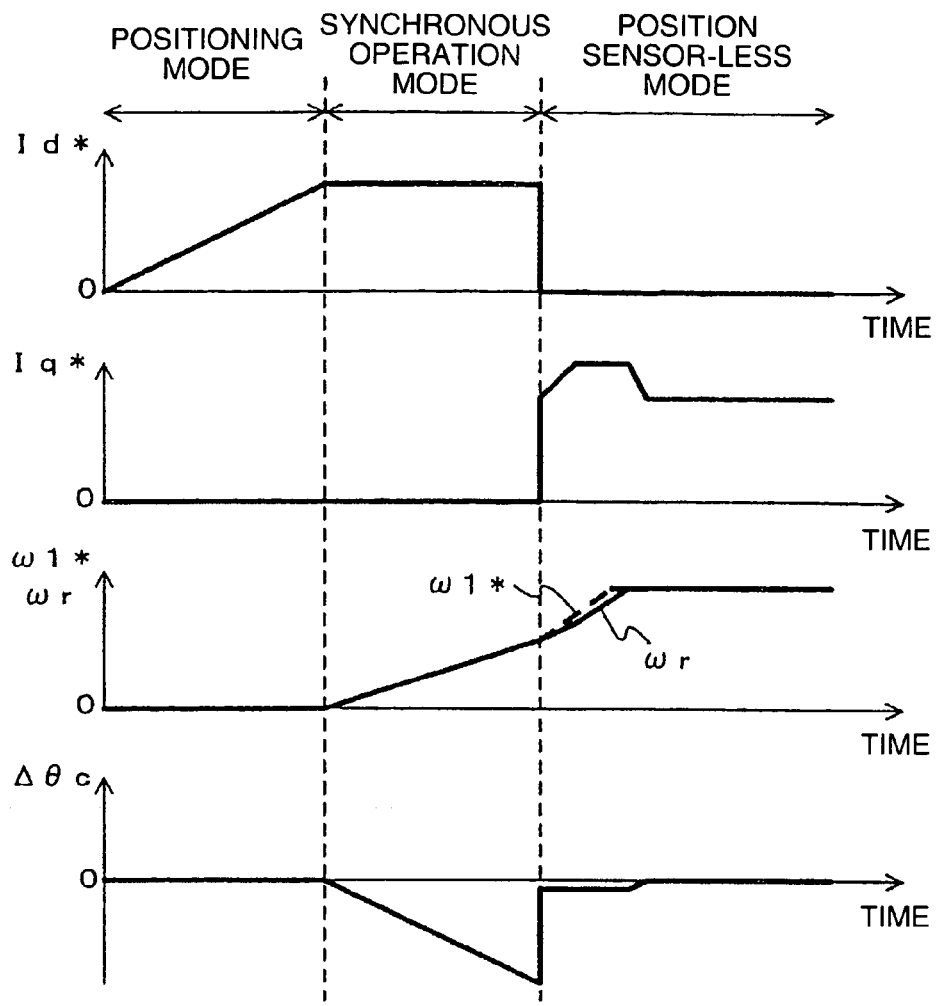
FIG. 10 shows an example of a test result obtained at the time of a heavy load in the case where an initial value of ASR is set to a value corresponding to an acceleration torque and a load torque.

FIGS. 9 and 10 show results obtained when the integral term initial value I0 for the automatic speed regulator 14 is set equal to a value corresponding to the acceleration torque and the load torque with the object of making the rotational frequency ωr follow the inverter frequency command value ω1* with little time delay in the case of the heavy load. FIG. 9 shows the case of a light load, whereas FIG. 10 shows the case of a heavy load.

Taking notice of the changes of the axis error Δθc and the rotational frequency ωr in the same way as the foregoing description, the axis error Δθc obtained after the changeover to the position sensor-less mode is approximately zero in the case of the heavy load (FIG. 10) and the rotational frequency ωr also nearly follows the inverter frequency command value ω1*. On the other hand, in the case of the light load (FIG. 9), the axis error Δθc assumes a large positive value and an excessive overshoot occurs in the rotational frequency ωr. The overshoot in the rotational frequency ωr is excessively large, and a designed maximum number of rotations is exceeded in some case depending upon the application of the motor controller 1, resulting in a problem.

From the results shown in FIGS. 7 to 10, it is appreciated that the rotational frequency ωr can be made to follow the inverter frequency command value ω1* without little time delay if the integral term initial value I0 for the automatic speed regulator 14 is set equal to a suitable value depending upon the load whereas a time delay is caused if the initial value is not suitable. In other words, it is necessary to find a suitable initial value for the automatic speed regulator 14 according to the load until transition to the position sensor-less operation.

In addition, it is necessary to make the axis error at the time of changeover to the position sensor-less operation mode approach 0 to the utmost. In the case of Id start with the d-axis current command value Id* being kept constant in the synchronous operation mode, an axis error of 0 degree occurs at no load and an axis error of +90 degrees occurs at a maximum load that can be started, as indicated in the above-described example.

For solving such a problem, it is an object of the present invention to find the integral term initial value I0 for the automatic speed regulator 14 on the basis of the q-axis current estimated value Iq^ in order to set the integral term initial value I0 equal to a suitable value depending upon the load and make the axis error at the time of changeover to the position sensor-less operation mode approach 0 to the utmost. By the way, the integral term initial value I0 may be found from a value proportionate to the torque of the permanent magnet motor instead of the q-axis current estimated value Iq^. A value proportionate to the torque may be input directly to the automatic speed regulator 14, the current regulators, or the voltage command value generator 3. The reason will now be described. Even if the value proportionate to the torque of the permanent magnet motor is input to the automatic speed regulator 14, the current regulators, or the voltage command value generator 3, the control unit 2 can output a control command commensurate with the torque. Therefore, it is possible to achieve the object of the present invention, i.e., to suppress a large speed change generated at the time of changeover from the synchronous operation mode to the position feedback operation mode. That is the reason.

In the present embodiment, how to find the integral term initial value I0 will be mentioned.

The load estimator which is one of components for implementing the above-described object will now be described. In the present embodiment, the load is supposed to be the motor output torque. The motor output torque τ and the torque current Iq have a relation represented by the following expression.

$$\tau = \{(3/2) \times P \times Ke\} \times Iq \quad \text{(expression 5)}$$

Here, P is the number of pole pairs, and Ke is an induced voltage constant. Since both P and Ke are constants, the motor output torque τ can be estimated by estimating Iq. Therefore, the load estimator 15 shown in FIG. 1 finds the q-axis current estimated value Iq^ by using the d-axis detected current Idc, the q-axis detected current Iqc and the axis error Δθc according to the following expression.

$$Iq^\wedge = Iqc \times \cos\Delta\theta c + Idc \times \sin\Delta\theta c \quad \text{(expression 6)}$$

Figure 11:
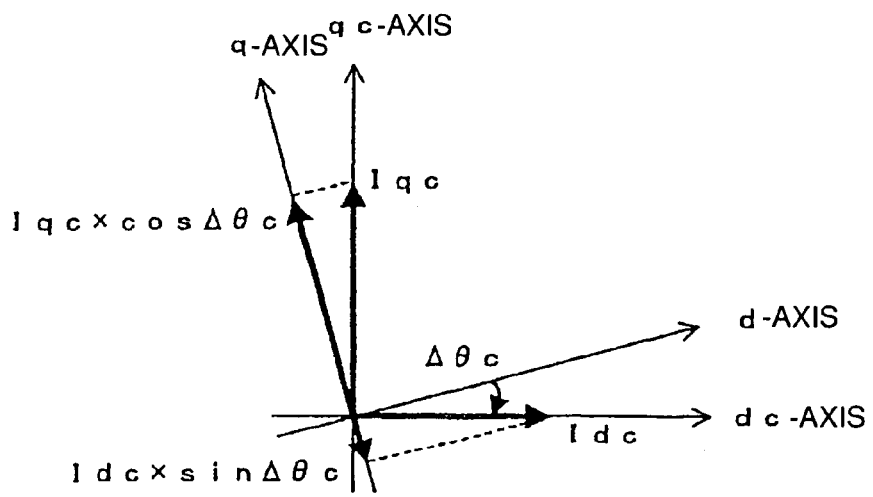
FIG. 11 is a vector diagram for explaining an axis error $\Delta\theta c$.

FIG. 11 shows representation of the (expression 6) using a vector diagram. A first term in the (expression 6) represents a magnitude obtained by projecting a current on the qc-axis onto the q-axis. A second term in the (expression 6) represents a magnitude obtained by projecting a current on the dc-axis onto the q-axis. In other words, the q-axis current Iq is found by using the detected currents on the control axes. This uses the principle that in the synchronous operation mode the current phase automatically shifts depending upon the load and Iq commensurate with the load flows.

In conducting arithmetic operations to find the integral term initial value I0 by using the q-axis current estimated value Iq^ obtained according to the (expression 6), there are a plurality of arithmetic operation methods described below. The methods can bring about effects according to the application.

(First method) The first method uses a q-axis current estimated value Iq^ obtained by using values of the d-axis detected current Idc, the q-axis detected current Iqc and the axis error Δθc at a final time point in the synchronous operation mode. According to this method, an integral term initial value I0 suited to the load state at the time of the operation mode changeover can be set.

(Second method) The second method uses Iq^ obtained by conducting arithmetic operation on average values of the d-axis detected current Idc, the q-axis detected current Iqc and the axis error Δθc in the synchronous operation mode over a certain definite section, or uses an average value of Iq^ found by using the d-axis detected current Idc, the q-axis detected current Iqc and the axis error Δθc at each moment. Even in the case where there are load ripples and there are variations in the detected values, influences can be minimized by using the average value in the synchronous operation mode according to this method.

Figure 12:
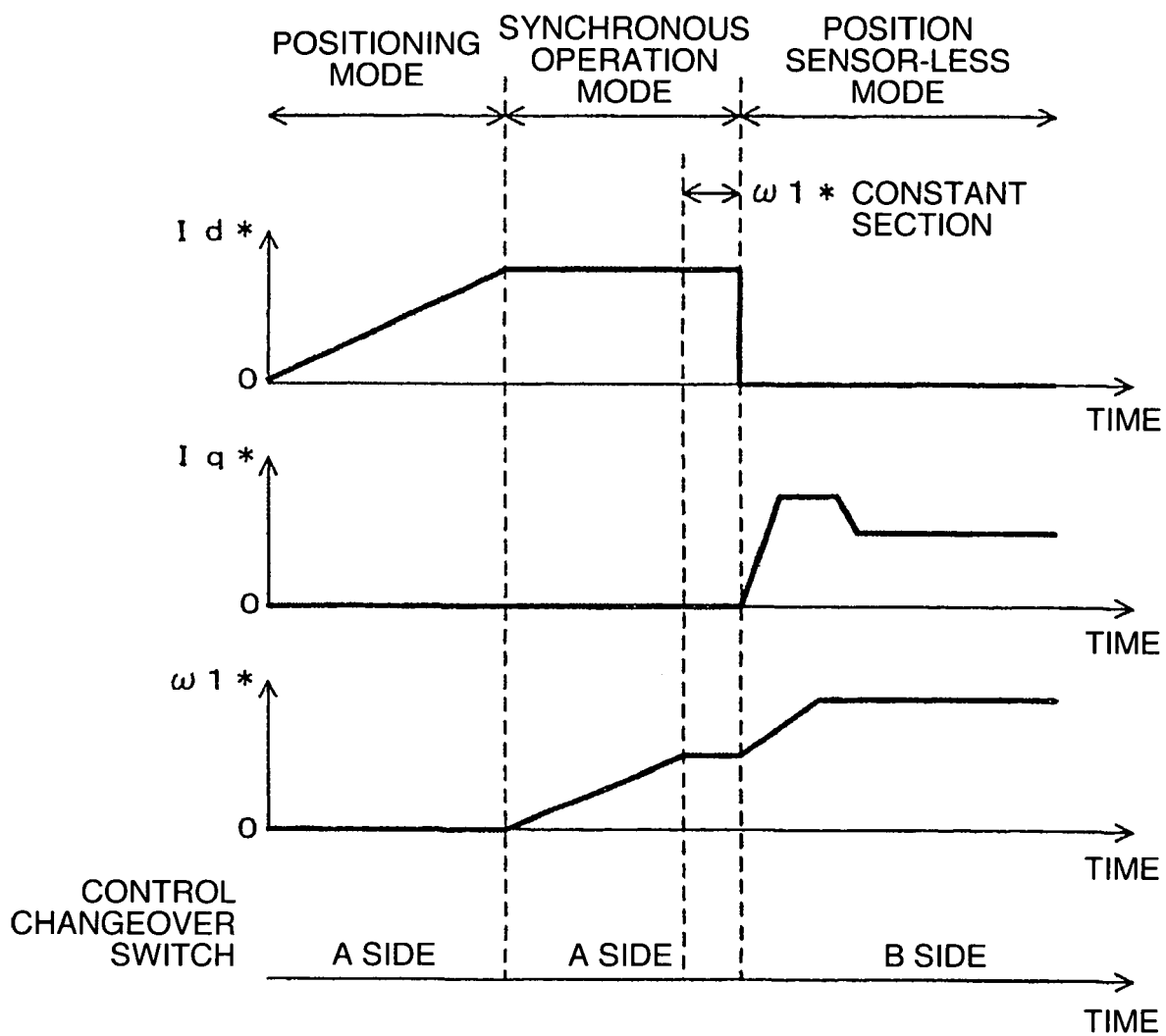
FIG. 12 shows an example of a simplified diagram for explaining changes of command values in the case where a section for making an inverter frequency command value ω1* constant is provided in a synchronous operation mode.

(Third method) As shown in FIG. 12, a time section over which the inverter frequency command value ω1* is kept constant is provided during the time period of the synchronous operation mode. A q-axis current estimated value Iq^ found by using the d-axis detected current Idc, the q-axis detected current Iqc and the axis error Δθc in that time section is used. In this time section, the acceleration torque disappears and the motor output torque becomes equal to the load torque. Therefore, Iq^ corresponding to the load torque can be set as the integral term initial value I0. In addition, the time section over which the inverter frequency command value ω1* is kept constant is set so as to become equal to at least one rotation in mechanical angle of the permanent magnet motor 6. As a result, a periodic ripple torque component which varies from section to section can be removed.

It is possible to cause the rotational frequency or to follow the inverter frequency command value ω1* with little time delay under any load by using the integral term initial value I0 found according to the arithmetic operation heretofore described. As a result, the shock caused at the time of operation mode changeover can be reduced remarkably. Because most loads periodically vary during one rotation in mechanical angle and an average value is needed to decrease the shock at the time of changeover.

In the case where torque ripples occur during a time period shorter than one period in mechanical angle, similar effects are obtained by keeping the frequency command constant over one period of the rippled torque.

Second Embodiment

A second embodiment of the motor controller 1 according to the present invention will now be described with reference to FIGS. 13 to 16. The second embodiment differs from the first embodiment in the configuration of the current detector for finding the d-axis detected current and the q-axis detected current flowing through the motor and the way of current command values in the synchronous operation mode.

Figure 13:
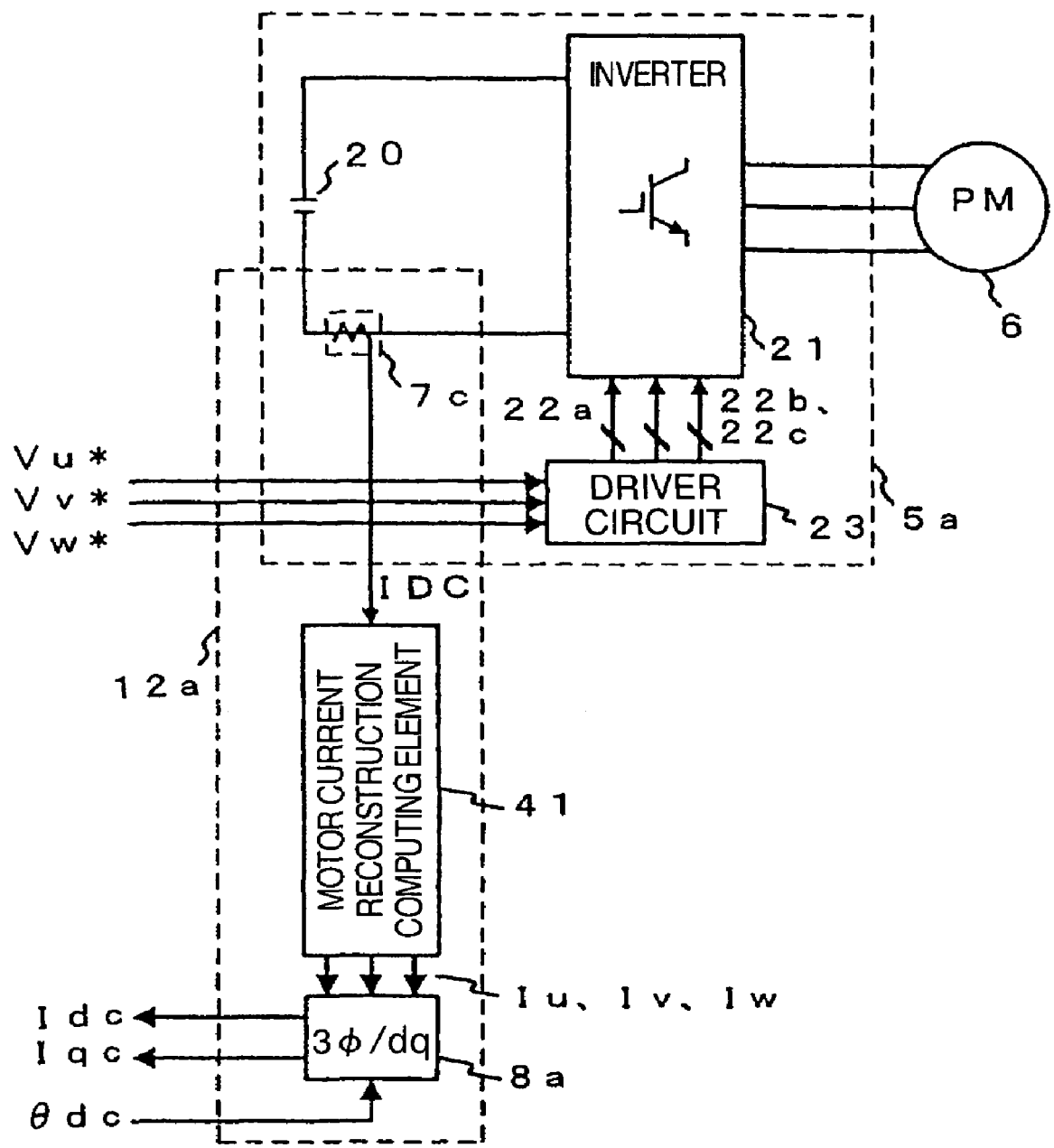
FIG. 13 shows an example of a configuration diagram of a current detector in a second embodiment of the present invention.

As shown in FIG. 13, a current detector 12a includes a current detection circuit 7c, a motor current reconstruction computing element 41 for reproducing three-phase AC currents (Iu, Iv and Iw) from an inverter input DC current IDC detected by the current detection circuit 7c, and a 3Ø/dq converter 8a for converting three-phase axes to the dq axes and finding the d-axis and q-axis detected currents (Idc and Iqc).

Figure 14:
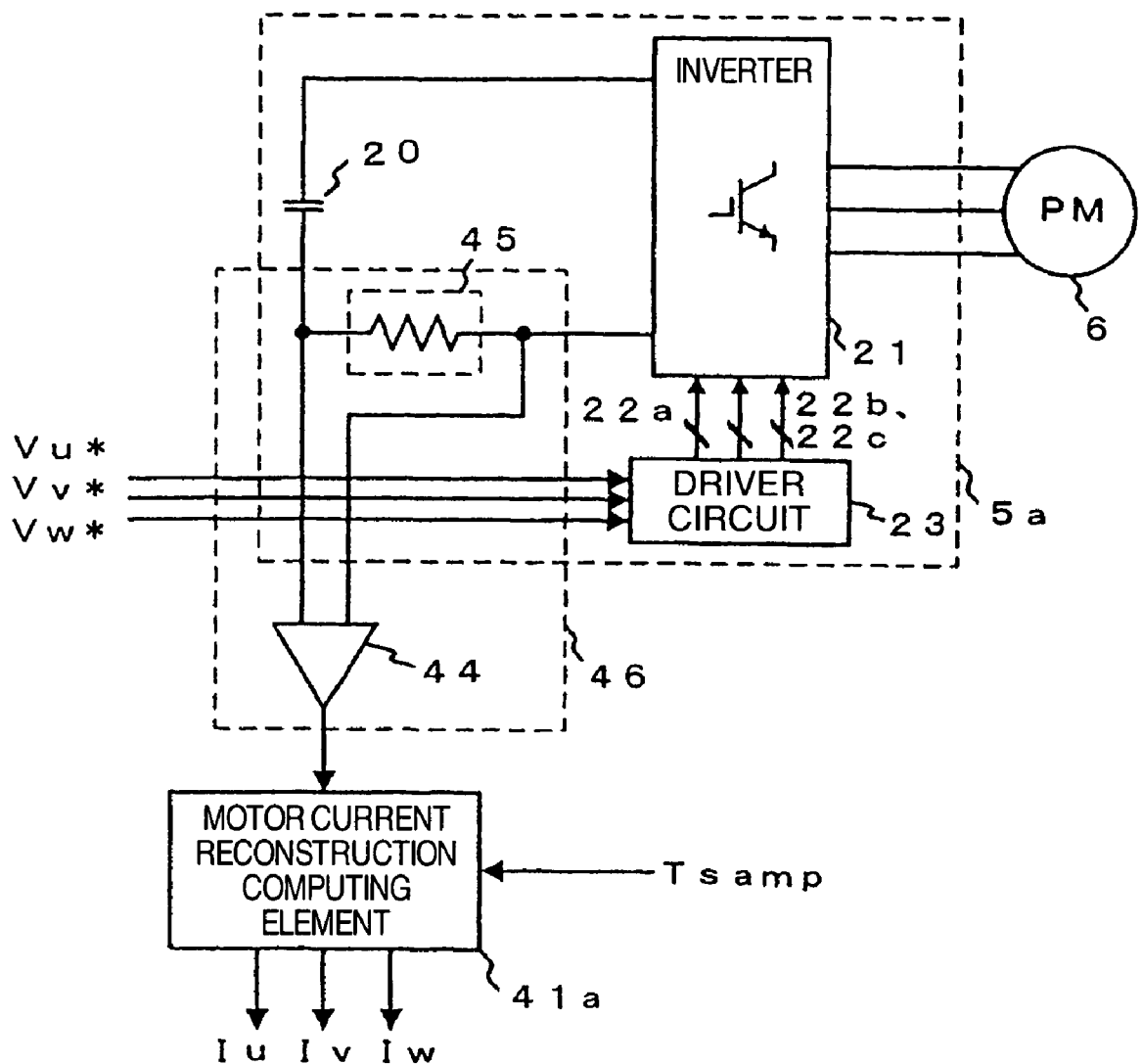
FIG. 14 shows an example of a configuration diagram of an inverter input DC current IDC detector in a second embodiment of the present invention.

In the present embodiment, means for detecting the inverter input DC current IDC of a power conversion circuit 5a has a configuration using a current detection resistor 45 (FIG. 14). In a current detection circuit 46 for detecting the inverter input DC current IDC, a voltage across the current detection resistor 45 is input to an operational amplifier 44 and detected. The operational amplifier 44 is formed of, for example, an IC such as an operational amplifier. If an inverter 21 is formed of a module having six switching elements in one package, such as an IPM (Intelligent Power Module), then a shunt resistor is incorporated in the package for the purpose of protecting the switching elements in many cases. In that case, it is not necessary to newly add a current detection resistor for current detection, and it becomes possible to reduce the number of parts and the space.

A motor current reconstruction computing element 41a for reproducing three-phase AC currents (Iu, Iv and Iw) from an inverter input DC current IDC detected by the current detection circuit 46 will now be described with reference to FIG. 15.

Figure 15:
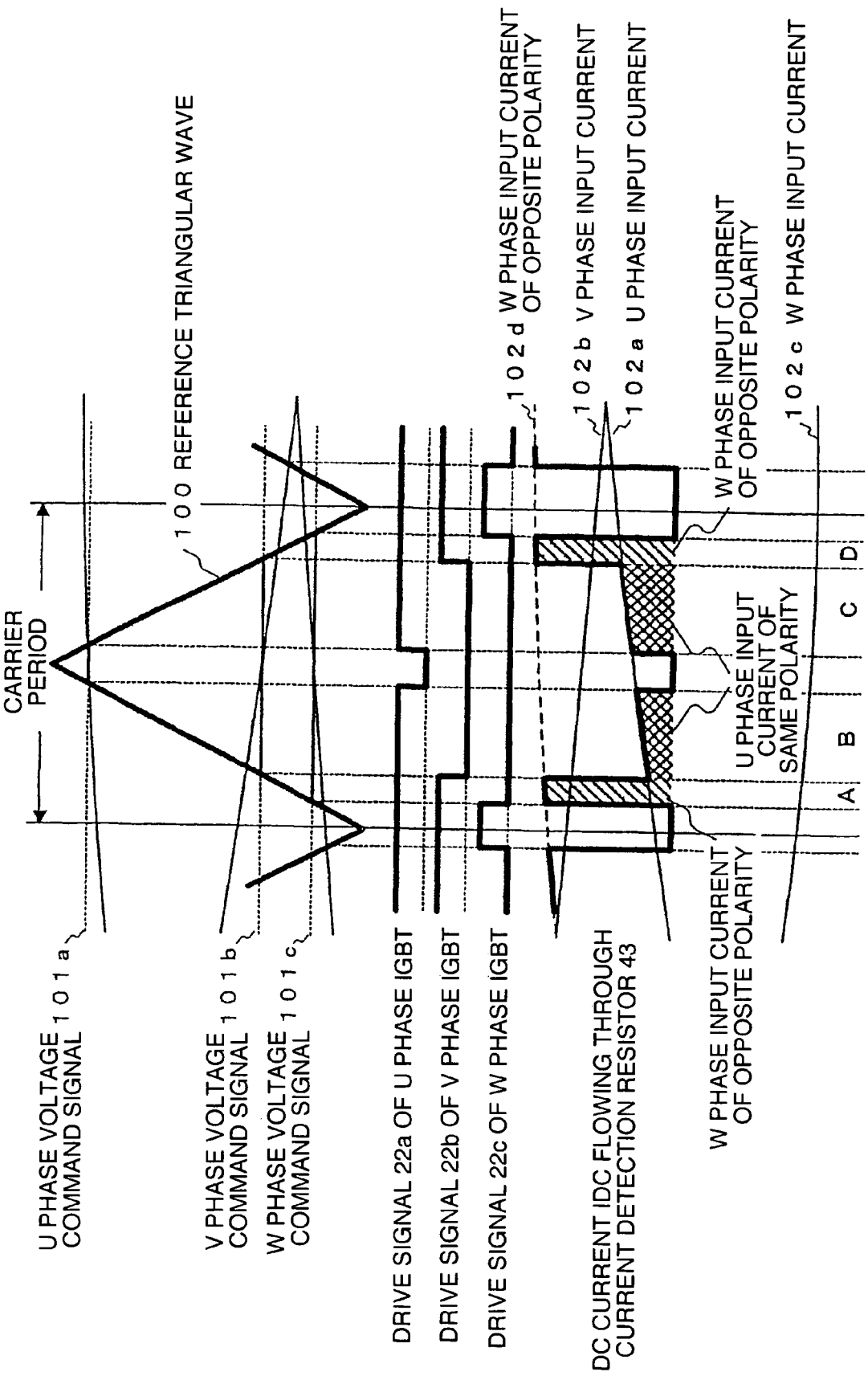
FIG. 15 shows an example of a waveform diagram for explaining a method for reproducing a motor current from a DC current.

FIG. 15 shows a reference triangular wave 100, voltage command signals (101a, 101b and 101c) of respective phases, PWM pulse signals (22a, 22b and 22c) serving as inverter drive signals of respective phases, input currents (102a to 102d) of respective phases, and the inverter input DC current IDC flowing through the current detection resistor 45. As appreciated from FIG. 15, the inverter input DC current IDC of the power conversion circuit 5a changes according to switching states of IGBTs of respective phases. As for each of drive signals (22a, 22b and 22c) of IGBTs of respective phases represent shown in FIG. 15, its high level means that an upper arm of the phase is in the on-state and its low level means that a lower arm of the phase is in the on-state. As a matter of fact, upper arms and lower arms of respective phases are supplied with respective independent PWM pulse signals to control switching operations. However, they are shown in a simplified way. In FIG. 15, dead time is not provided for the purpose of description. As a matter of fact, however, dead time is provided to prevent the upper arm and the lower arm of each phase from being short-circuited to each other.

During time sections A and D shown in FIG. 15 over which the lower arm of only the W phase is on and the upper arms of the U phase and V phase are on, a W phase input current having an opposite polarity can be observed. During time sections B and C over which the lower arms of the V phase and the W phase are on and the upper arm of only the U phase is on, a U phase input current having the same polarity can be observed.

The motor current reconstruction computing element 41a has a sample-and-hold function. The motor current reconstruction computing element 41a outputs three-phase AC motor currents by conducting sample-and-hold operation on the inverter input DC current IDC of the power conversion circuit 5a in accordance with a sample-and-hold signal Tsamp which indicates the time sections A to D shown in FIG. 15 and combining the inverter input DC currents IDC of the power conversion circuit 5a in respective time sections.

In this way, three-phase AC motor currents can be reproduced by observing the inverter input DC current IDC, which changes according to the switching states of IGBTs in respective phase, in the time sections A to D and combining the inverter input DC currents IDC of the power conversion circuit 5a in respective time sections.

How to supply the current command values in the synchronous operation mode will now be described.

In the positioning mode, a DC current is let flow through the d-axis and the rotor is fixed in the position of the d-axis of the permanent magnet motor 6 in the same way as the first embodiment. After the positioning is finished, transition to the synchronous operation mode is conducted. In the present embodiment, Id* and Iq* in the synchronous operation mode are found by using the following expression.

$$Id^* = Kpos1 \times Ipos \times \cos\theta p$$

$$Iq^* = Kpos2 \times Ipos \times \sin\theta p$$

$$\theta p = \omega pos \times T \quad \text{(expression 7)}$$

Here, Ipos is a value of a current let flow at a final time point in the positioning mode, Kpos1 and Kpos2 are current amplitude adjustment gains, ωpos is a change quantity of a current phase θp per unit time, and T is time elapsed since transition to the synchronous operation mode.

In the case of the Id start with a current let flow only through the d-axis described with reference to the first embodiment, the axis error Δθc becomes 0° at the time of no load and becomes +90° at the time of the maximum load, as already described. On the other hand, although not described in detail, in the case of the Iq start with a current let flow conversely only through the q-axis, the axis error Δθc becomes −90° at the time of no load and becomes 0° at the time of the maximum load, when changeover to the position sensor-less mode is conducted. In either case, an axis error of 90° at its maximum occurs. As a result, the PLL controller 13 shown in FIG. 1 functions so as to make the axis error equal to 0, and correct speed detection cannot be conducted because of a large variation in the detected frequency ω1. Therefore, the changeover shock becomes large.

In the present embodiment, a current phase θp is changed in the synchronous operation mode to reduce the current flowing through only the d-axis and let a current flow through the q-axis as well. It is possible to reduce the maximum value of the axis error Δθc and decrease the changeover shock by thus changing the current phase in the synchronous operation mode.

There are a plurality of arithmetic operation methods described below according to a method for determining current amplitude adjustment gains Kpos1 and Kpos2. The arithmetic operation methods can bring about effects depending upon the application.

Figure 16:
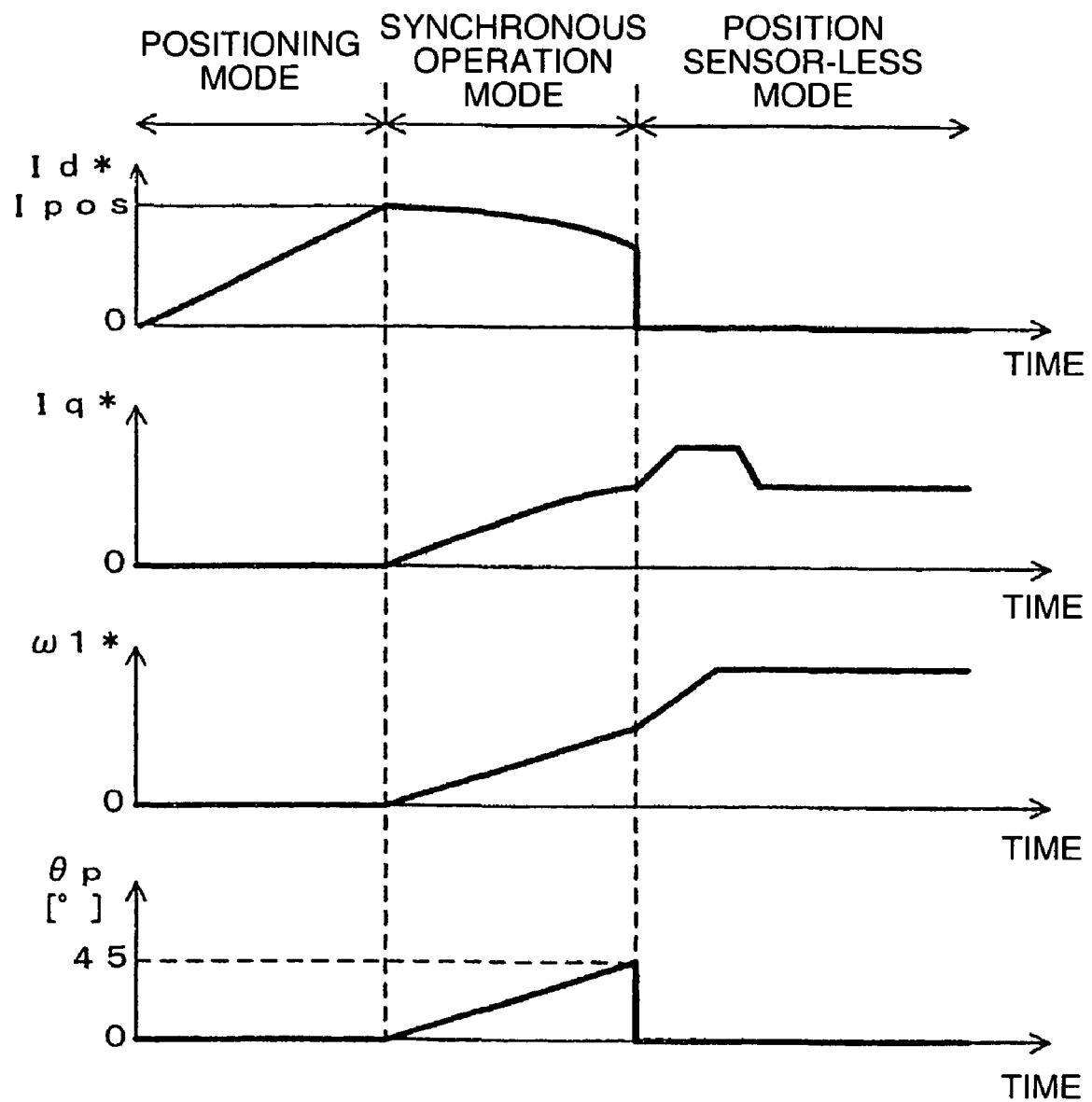
FIG. 16 shows an example of a simplified diagram for explaining changes of respective command values in the case where a current phase θp is changed in the synchronous operation mode.

(First method) In the first method, Kpos1 and Kpos2 are set so as to satisfy the relation Kpos1=Kpos2=1 and the current phase θp is set so as to satisfy the relation θp=45° at the time of changeover to the position sensor-less mode. In this case, the relation Id*=Iq* is satisfied at the time of changeover to the position sensor-less mode. FIG. 16 shows changes of respective command values under the maximum load condition. In the synchronous operation mode, the current phase θp changes from 0° to 45°. At the time of mode changeover, the axis error Δθc becomes +45°. On the other hand, the axis error Δθc becomes −45° at the time of no load. Over the whole load range, the axis error Δθc is +45° even at its maximum.

(Second method) In the second method, Kpos1 and Kpos2 are set so as to satisfy the relations Kpos1=1 and Kpos2=Iq^/Ipos and the current phase θp is set so as to satisfy the relation θp=90° at the time of changeover to the position sensor-less mode. This method has a feature that the output of the load estimator shown in FIG. 1, i.e., Iq^ found by using the (expression 6) is used as Kpos2. And the current phase Op satisfies the relation θp=90° at the time of changeover to the position sensor-less mode. At that time point, therefore, the relations Id*=0 and Iq*=Iq^ are satisfied and the axis error becomes approximately 0.

(Third method) In the third method, Kpos1 and Kpos2 are set so as to satisfy the relation Kpos1=Kpos2=Iq^/Ipos, and the current phase θp is set so as to satisfy the relation θp=90° at the time of changeover to the position sensor-less mode. This method has a feature that the output of the load estimator shown in FIG. 1, i.e., Iq^ found by using the (expression 6) is used as Kpos1 and Kpos2. The third method differs from the second method in that the axis error is always approximately 0 in the synchronous operation mode as well.

(Fourth method) In the fourth method, the first method is used in the initial stage of the synchronous operation mode, and the second method or the third method is used at least in the end stage of the synchronous operation mode. This method is optimum in the case where the axis error Δθc contains a large estimation error in the initial stage of the synchronous operation mode.

Third Embodiment

Hereafter, a third embodiment of the motor controller according to the present invention will be described.

Figure 17:
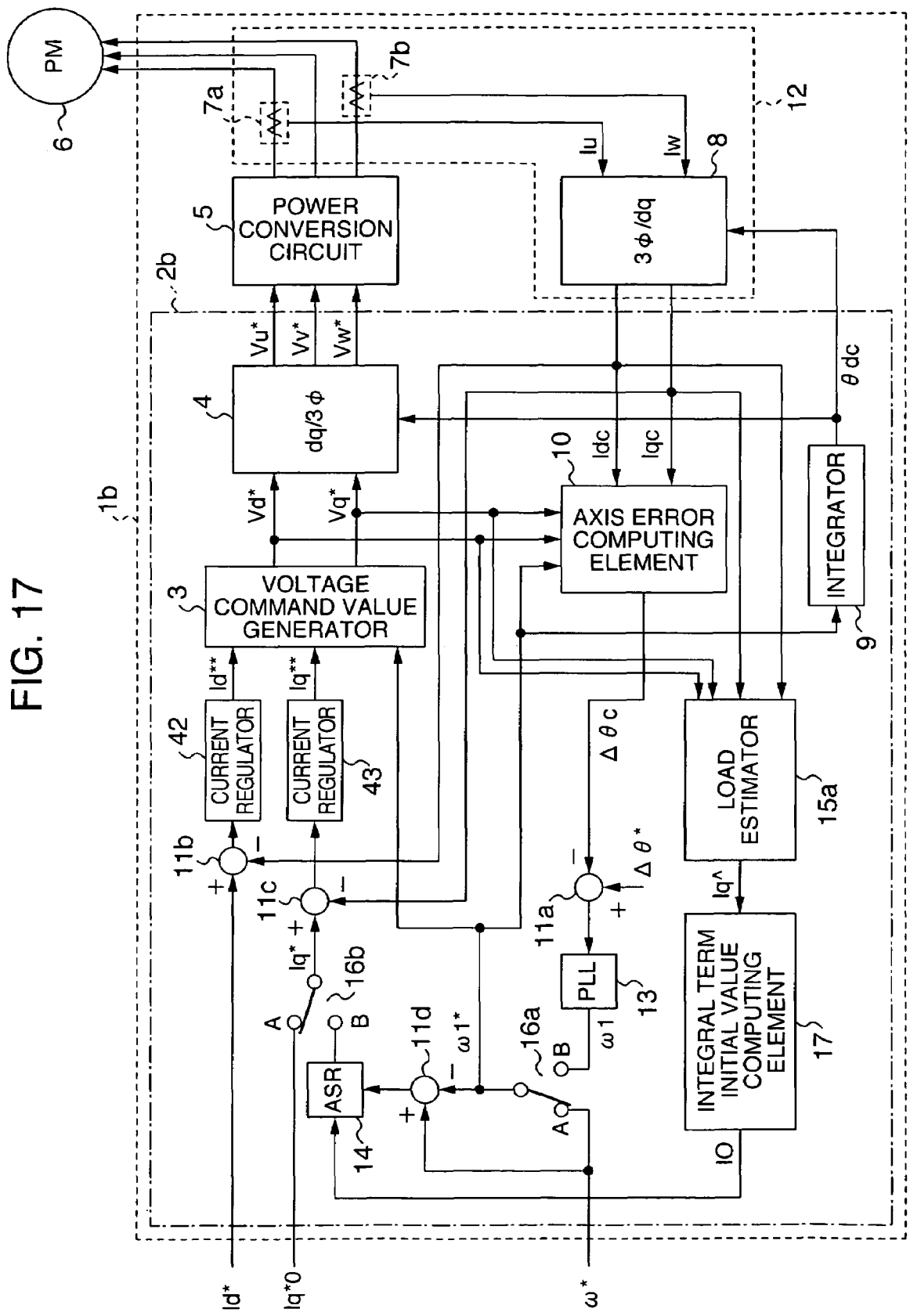
FIG. 17 shows an example of a general configuration diagram in a fourth embodiment of the present invention.

FIG. 17 is a general configuration diagram of a motor controller 1b in the present embodiment. The present embodiment differs from the two embodiments described earlier in the configuration of the load estimator. A load estimator 15a has a configuration supplied with the d-axis and q-axis voltage command values (Vd* and Vq*) and the d-axis and q-axis detected currents (Idc and Iqc) to conduct arithmetic operation to find the active power and the torque estimated value (τ^) of the permanent magnet motor according to the following expression.

$$\tau^{\char`\^} = (Wp - Wcu)/\omega r$$

$$= \{(3/2) \times (Vd^* \times Idc + Vq^* \times Iqc)$$

$$- (3/2) \times R \times (Idc^2 + Iq^2)\}$$

$$/(\omega^*/P) \quad \text{(expression 8)}$$

In the (expression 8), Wp is the active power, Wcu is the copper loss, ωr is the actual rotational frequency of the permanent magnet motor, R is the primary winding resistance value of the permanent magnet motor 6, ω* is the frequency command value, and P is the number of pole pairs of the permanent magnet motor.

In addition, the q-axis current estimated value (Iq^) is estimated on the basis of τ^ found by using (the expression 8), by using the following expression.

$$Iq^{\char`\^} = \tau^{\char`\^}/\{(3/2) \times P \times Ke\} \quad \text{(expression 9)}$$

In the (expression 9), τ^ is the estimated torque, P is the number of pole pairs, and Ke is the induced voltage constant.

By using Iq^ estimated on the basis of (the expression 8) and the (expression 9), it is possible as indicated in the foregoing two embodiments to conduct arithmetic operation to find the integral term initial value I0 for the integral computing element 14B included in the automatic speed regulator 14 at the time of changeover to the position sensor-less mode, and apply Iq^ to Kpos1 and Kpos2 indicated in the (expression 7) to generate Id* and Iq* in the synchronous operation mode.

The present embodiment is based on the conception that the motor output is found by subtracting the copper loss from the active power and the estimated torque is found on the basis of the motor output. Since the values used in the (expression 8) do not depend on the rotor position, the estimated torque can be found even in the case where the axis error Δθc occurs.

In addition, the present embodiment has a feature that the estimated torque can be found by means of a simple arithmetic operation using only the four rules. The present embodiment has a feature that the torque can be estimated with higher precision as the active power becomes greater than the copper loss.

Fourth Embodiment

Figure 18:
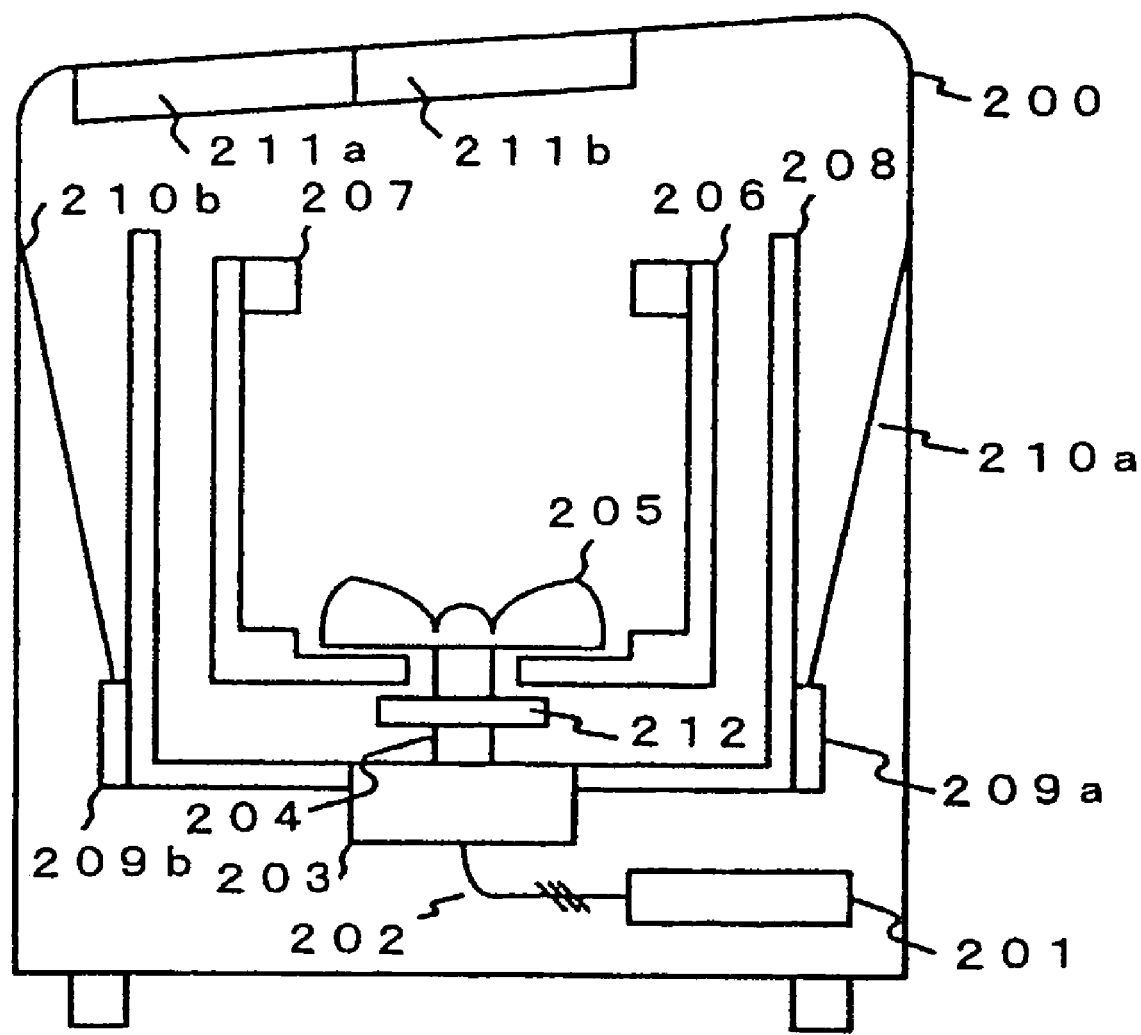
FIG. 18 shows an example of a schematic diagram of a washing machine at the time when the present invention is applied to a drive system in the washing machine.

A fourth embodiment of the motor controller according to the present invention will now be described with reference to FIG. 18. FIG. 18 is a schematic diagram at the time when a motor controller 201 according to the present invention is applied to a drive system in a washing machine. The washing machine 200 has a configuration including a washing vessel 206 and a pulsator 205 in a water accepting vessel 208. The washing vessel 206 and the pulsator 205 are driven by a drive motor 203. Either the washing vessel 206 or the pulsator 205 is selected by a clutch 204 during a washing process so as to be driven. The clutch 204 may have a configuration provided with a deceleration mechanism, or may have a configuration that is not provided with a deceleration mechanism. The motor controller 201 applies an AC voltage to the drive motor 203 via motor wiring 202 to drive it.

The washing process of the washing machine is broadly divided into "washing," "rinsing," "dehydration" and "drying." These processes have a feature that the frequency command ω* and the start time change and the load torque and the moment of inertia remarkably change according to the quantity and cloth quality of the laundry. Especially in the start for "washing," the pulsator 205 is driven by the drive motor 203 in the state in which the laundry is soaked in water. Therefore, the load torque viewed from the drive motor 203 changes momentarily. It is no exaggeration to say that there are no stationary states in the washing machine. In such application, it is very difficult especially to determine the response frequency of the automatic speed regulator 14 uniquely. If the response frequency is suited to some load, the performance is degraded under another load, resulting in trade-off. However, the characteristics at the time of start can be made nearly constant by using the automatic speed regulator 15 according to the present invention. The d-axis and q-axis detected currents are detected from the inverter input DC current IDC of the power conversion circuit 5a and used for control. In addition, the inverter frequency command value ω1* is corrected by using the PLL method so as to make the calculated axis error Δθc equal to zero, and estimation is conducted to find the estimated magnetic pole position θdc. As a result, the motor current detectors (7a and 7b) and the position sensor can be omitted, and the washing vessel can be made larger.

Fifth Embodiment

Figure 19:
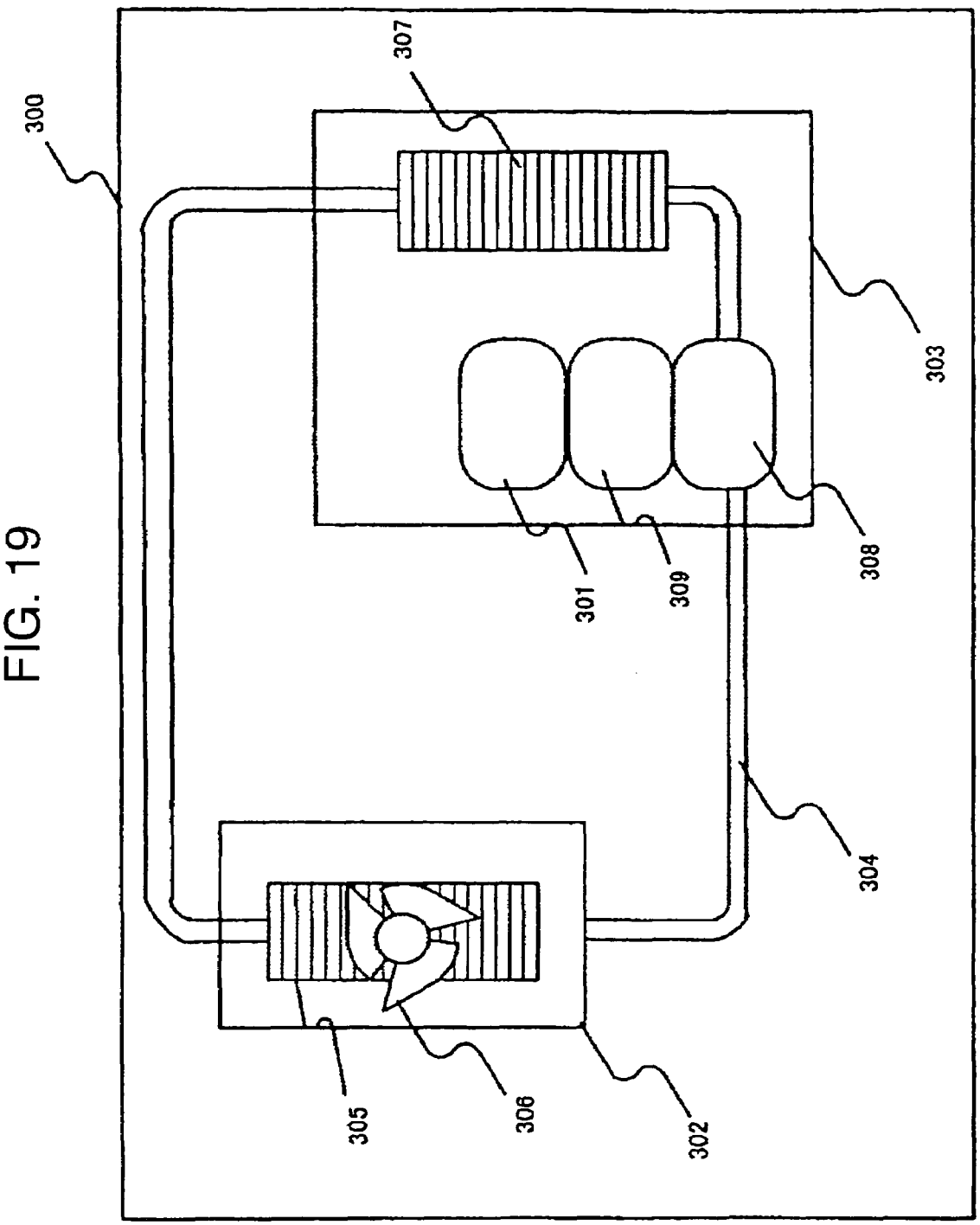
FIG. 19 shows an example of a schematic diagram of an air conditioner at the time when the present invention is applied to a drive system in the air conditioner.

A fifth embodiment of the motor controller according to the present invention will now be described with reference to FIG. 19. FIG. 19 is a schematic diagram at the time when a motor controller 301 according to the present invention is applied to an air conditioner 300. The air conditioner includes an indoor machine 302 and an outdoor machine 303. The indoor machine and the outdoor machine are connected to each other via piping 304, and a coolant flows through the piping. The indoor machine includes a heat exchanger 305 and a blower 306. The outdoor machine includes a heat exchanger 307, a compressor 308, a compressor drive motor 309, and the motor controller 301. In the air conditioner, the coolant flows between the indoor machine and the outdoor machine. The air conditioner feeds a cold blast or a hot blast into the room by using the heat exchanger in the indoor machine.

In such a configuration, torque ripples are caused in the compressor every rotation in mechanical angle or by load characteristics. There is an equalized pressure state having little pressure difference between the input side and the outside of the compressor and a differential pressure state having a differential pressure. The configuration has a feature that the load torque viewed from the compressor drive motor is light in the equalized pressure state and it is heavy in the differential pressure state. If, for example, the motor is started in conformity with the equalized pressure state in such application, the shock at the time of changeover to the position sensor-less mode occurs in the differential pressure state, resulting in poor start performance. If, to the contrary, the motor is started in conformity with the differential state, the start performance in the equalized pressure state is aggravated.

Therefore, it becomes possible to estimate the torque commensurate with the load by using the load estimator 15 according to the present invention. It also becomes to implement smooth start under any pressure state. As a result, it becomes possible to implement "quick air cooling" (or "quick heating") which is an important function of the air conditioner, under any condition.

Sixth Embodiment

Figure 20:
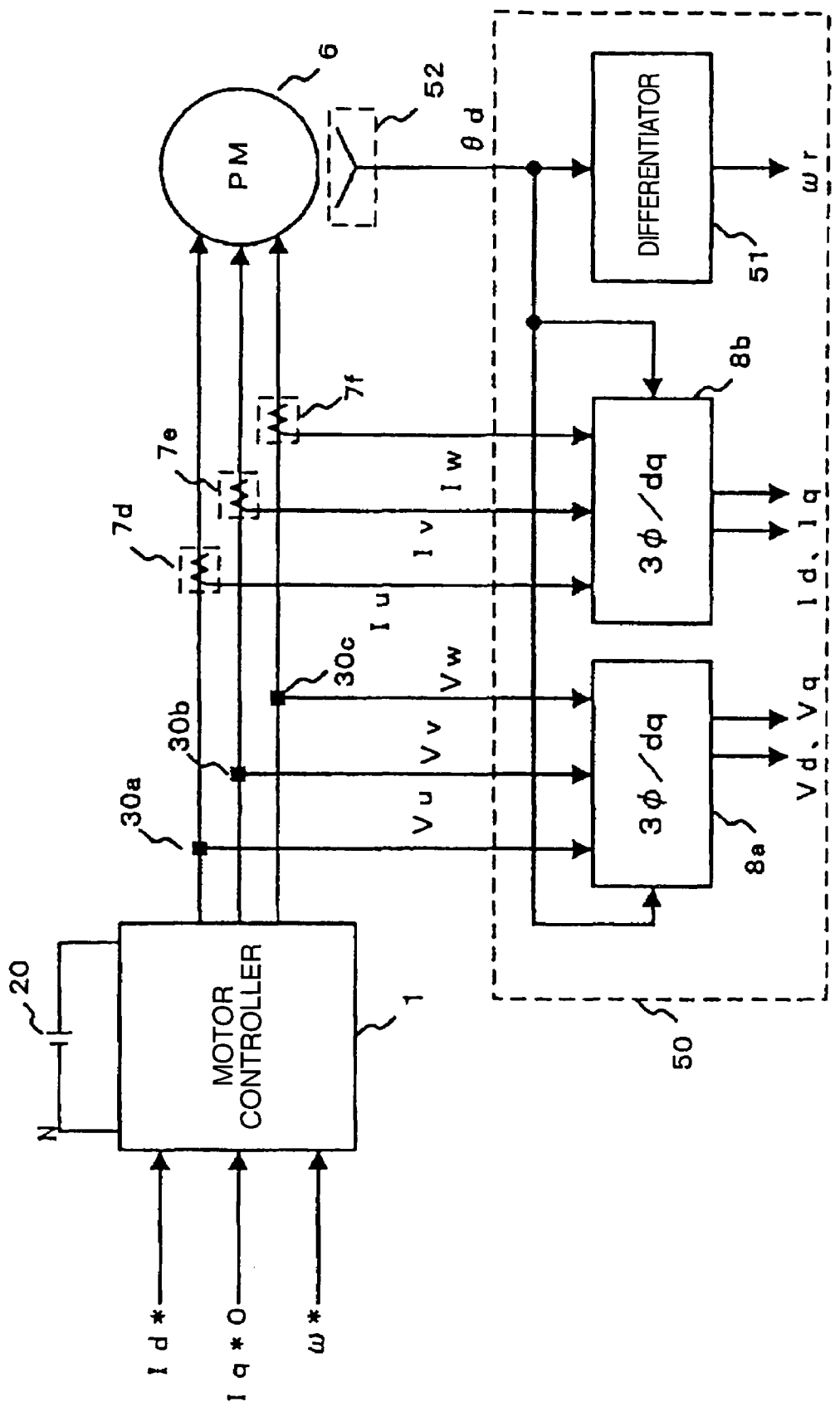
FIG. 20 shows an example of a configuration diagram used when verifying operation according to the present invention.

The control unit 2 in the motor controller 1 according to the present invention is formed of software by using a semiconductor integrated circuit such as a microcomputer or a DSP, in many cases. Therefore, there is a drawback that it is difficult to verify whether the control unit 2 is configured properly. In the present embodiment, therefore, a method for verifying whether the configuration according to the present invention is operating properly will now be described with reference to FIG. 20.

Values to be measured are three-phase voltage values (Vu, Vv and Vw), three-phase current values (Iu, Iv and Iw), and the magnetic pole position θd of the permanent magnet motor 6 output from the motor controller 1.

The three-phase voltage values can be measured by measuring voltages between an N side and respective phase terminals (30a, 30b and 30c) of the DC voltage source 20. Or it is also possible to measure line voltages of respective phases and calculate the three-phase voltage values on the basis of the measured line voltages.

The three-phase current values can be measured by using, for example, a CT (current transformer) or the like.

The magnetic pole position θd of the permanent magnet motor 6 can be measured by attaching a magnet pole position sensor 52 using, for example, an encoder or the like to the permanent magnet motor 6. θd is defined as the position of the rotor of the permanent magnet motor 6 in the magnetic flux direction, and the direction of the winding magnetic flux generated when a current is let flow in the U phase of the stator side is selected as 0°. The three-phase voltage values and the three-phase current are input to 3Ø/dq converters (8a and 8b), and dq-axis voltage values (Vd and Vq) and dq-axis current values (Id and Iq) are obtained by using the magnetic pole position ed.

Since the control unit 2 does not exercise position control in the synchronous operation mode, an axis error between the actual rotation coordinate axes and the control axes occurs. Therefore, the dq-axis currents change according to the load. Therefore, dq-axis voltage values (Vd and Vq) are given attention, and it is determined whether the relations in the (expression 1) are satisfied. For example, if Iq* is kept at zero in the synchronous operation mode as in the first embodiment, a voltage corresponding to R×Id* ought to be output.

In the position sensor-less mode, movements of respective values caused at the time of mode transition are given attention. If the load estimator 15 is functioning normally, respective values change at the time of mode transition. A discontinuous current waveform is observed under some load. Subsequently, only the load of the permanent magnet motor 6 is changed without changing the operation conditions in the positioning mode and the synchronous operation mode, and changes of respective values at the time of mode transition are observed. If Vq at the time of transition to the position sensor-less mode increases as the load increases, it can be ascertained that the load estimation is being conducted normally. In addition, the magnetic pole position θd is input to a differentiator 51, and the actual rotational frequency ωr of the permanent magnet motor 6 is found. If the rotational frequency ωr follows the inverter frequency command value ω1* with little time delay regardless of the load, the final effect of the load estimation can be ascertained.

Seventh Embodiment

A seventh embodiment of the motor controller according to the present invention will now be described with reference to FIG. 21.

Figure 21:
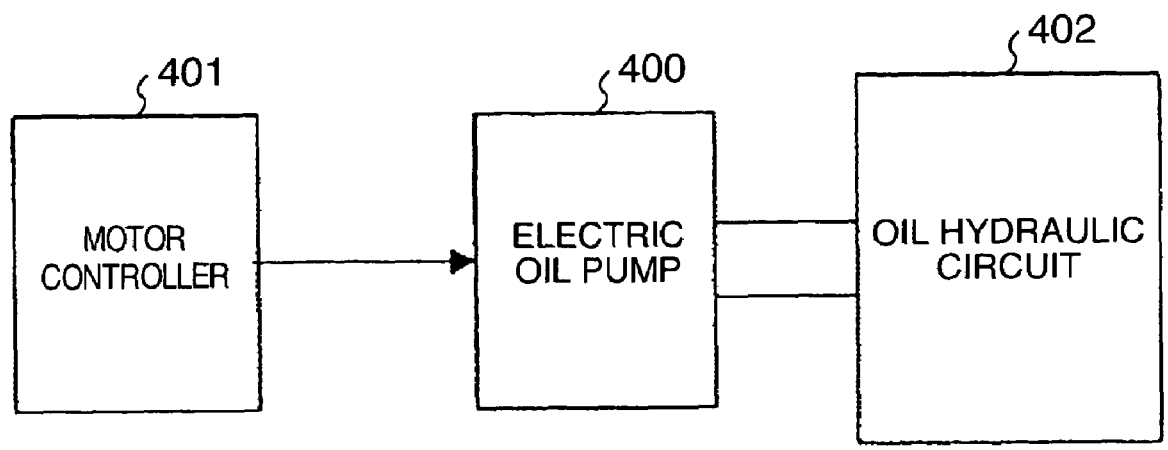
FIG. 21 shows an example of a schematic diagram at the time when the present invention is applied to an electric oil pump.

FIG. 21 shows an example of a schematic diagram at the time when a motor controller 401 according to the present invention is applied to an electric oil pump 400.

A discharge pressure (pressure) of an oil hydraulic circuit is adjusted by the electric oil pump 400. Unless the load estimator 15 is present, however, quick acceleration and deceleration occurs in the motor 6 at the time of changeover from the "synchronous operation mode" to the "position sensor-less mode" shown in FIG. 2. This results in a problem that the oil hydraulics cannot be kept constant (or it takes a long time for oil hydraulics to become constant).

Therefore, it becomes possible to estimate torque commensurate with the load and keep oil hydraulics constant rapidly by using the load estimator 15 according to the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor controller comprising:
   current regulators supplied with current command values;
   a voltage command value generator supplied with outputs of said current regulators; and
   a power conversion circuit for applying a voltage to a permanent magnet motor in accordance with an output of said voltage command value generator,
   wherein
   said motor controller has a synchronous operation mode in which position feedback is not conducted,
   said motor controller has an operation mode using position feedback, and
   in the synchronous operation mode, an arithmetic operation for estimating a value proportionate to a torque of the permanent magnet motor is conducted, a control constant concerning an automatic speed regulator, said current regulators or said voltage command value generator is set on the basis of the value proportionate to the torque of the permanent magnet motor, and a shift to the operation mode using position feedback is conducted.

2. A motor controller according to claim 1, wherein the control constant is a value for generating a current command value or a current command.

3. A motor controller according to claim 1, wherein
   a position error between an actual rotation position of the permanent magnet motor and a virtual rotation position in control is found by using a voltage command value, motor current information, and the motor constant, and
   an arithmetic operation for estimating the value proportionate to the torque of the permanent magnet motor is conducted by using the position error.

4. A motor controller according to claim 1, wherein
   active power of the permanent magnet motor is found by using a voltage command value, motor current information, and the motor constant, and
   an arithmetic operation for estimating the value proportionate to the torque of the permanent magnet motor is conducted by using the active power.

5. A motor controller according to claim 4, wherein
   the value proportionate to the torque of the permanent magnet motor is a q-axis current estimated value,
   motor input active power is found on the basis of a voltage command value and a motor current, and a motor loss is found on the basis of the motor constant and a motor current,
   a motor output is found on the basis of the motor input active power and the motor loss,
   a torque estimated value is found by using the motor output and a motor speed or a motor speed estimated value, and
   the q-axis current estimated value is estimated on the basis of the torque estimated value.

6. A motor controller according to claim 1, wherein the value proportionate to the torque of the permanent magnet motor is a q-axis current estimated value.

7. A motor controller according to claim 6, further comprising an automatic speed regulator, the automatic speed regulator operating only in the operation mode using position feedback, the automatic speed regulator being supplied with a speed command, a detected speed or an estimated speed to output a current command,
   wherein setting is conducted on an integral element included in the automatic speed regulator and concerning the current command on the basis of the q-axis current estimated value.

8. A motor controller according to claim 1, wherein
   a time period over which a frequency command is kept constant is provided in the synchronous operation mode, and
   an arithmetic operation for estimating the value proportionate to the torque of the permanent magnet motor is conducted by using motor current information obtained during the time period.

9. A motor controller according to claim 8, wherein the time period over which the frequency command is kept constant corresponds to at least one rotation in mechanical angle of a rotor in the permanent magnet motor.

10. A motor controller according to claim 8, wherein the time period over which the frequency command is kept constant corresponds to at least one period in torque ripple periods caused by load characteristics.

11. A motor controller according to claim 1, wherein an arithmetic operation for estimating the value proportionate to the torque of the permanent magnet motor is conducted on the basis of motor current information obtained immediately before the shift from the synchronous operation mode to the operation mode using position feedback.

12. A motor controller according to claim 1, wherein an arithmetic operation for estimating the value proportionate to the torque of the permanent magnet motor is conducted by finding an average value of a plurality of arithmetic operation results for the value proportionate to the torque obtained during a definite time period in the synchronous operation mode.

13. A motor controller for a permanent magnet motor started in:
   a positioning mode in which a current is let flow in a specific phase and positioning of a rotor is conducted;
   a synchronous operation mode in which an AC current is let flow and position feedback is not conducted; and
   an operation mode using position feedback,
   wherein during a time period of the synchronous operation mode, a ratio between a first current in a phase of a current let flow at the time of positioning and a second current in a phase led in a rotation direction by 90 degrees is changed successively.

14. A motor controller according to claim 13, wherein the first current is a d-axis current and the second current is a q-axis current, or the first current is a q-axis current and the second current is a d-axis current.

15. A motor controller according to claim 13, wherein the first current becomes nearly equal to the second current immediately before changeover from the synchronous operation mode to the operation mode using position feedback.

16. A motor controller according to claim 13, wherein
   an arithmetic operation for estimating a value proportionate to a torque of the permanent magnet motor is conducted in the synchronous operation mode, and
   the ratio between the first current and the second current obtained immediately before changeover from the synchronous operation mode to the operation mode using position feedback is changed in a direction in which the first current decreases or in a direction in which the second current increases, as the torque increases on the basis of the value proportionate to the torque of the permanent magnet motor.

17. A washing machine having a motor system, the motor system comprising:
   a permanent magnet motor;
   current regulators supplied with current command values;
   a voltage command value generator supplied with outputs of said current regulators; and
   a power conversion circuit for applying a voltage to a permanent magnet motor in accordance with an output of said voltage command value generator,
   wherein
   the motor system has a synchronous operation mode in which position feedback is not conducted,
   the motor system has an operation mode using position feedback,
   in the synchronous operation mode, an arithmetic operation for estimating a value proportionate to a torque of said permanent magnet motor is conducted, a control constant concerning an automatic speed regulator, said current regulators or said voltage command value generator is set on the basis of the value proportionate to the torque of said permanent magnet motor, and a shift to the operation mode using position feedback is conducted, and
   a washing, rinsing, dehydration or drying process is executed by using said permanent magnet motor as a rotation drive source and by rotating either a pulsator in a washing vessel connected to said permanent magnet motor directly or via a changeover mechanism for engaging or disengaging with a rotation axis, or a washing/dehydration vessel supported in an outer vessel by a rotation axis so as to be freely rotatable around the rotation axis.

18. An air conditioner having a motor system, the motor system comprising:
   a permanent magnet motor;
   current regulators supplied with current command values;
   a voltage command value generator supplied with outputs of said current regulators; and
   a power conversion circuit for applying a voltage to a permanent magnet motor in accordance with an output of said voltage command value generator,
   wherein
   the motor system has a synchronous operation mode in which position feedback is not conducted,
   the motor system has an operation mode using position feedback,
   in the synchronous operation mode, an arithmetic operation for estimating a value proportionate to a torque of said permanent magnet motor is conducted, a control constant concerning an automatic speed regulator, said current regulators or said voltage command value generator is set on the basis of the value proportionate to the torque of said permanent magnet motor, and a shift to the operation mode using position feedback is conducted, and
   said permanent magnet motor is used as a rotation drive source of a compressor.

19. An electric oil pump having a motor system, the motor system comprising:
   a permanent magnet motor;
   current regulators supplied with current command values;
   a voltage command value generator supplied with outputs of said current regulators; and
   a power conversion circuit for applying a voltage to a permanent magnet motor in accordance with an output of said voltage command value generator,
   wherein
   the motor system has a synchronous operation mode in which position feedback is not conducted,
   the motor system has an operation mode using position feedback,
   in the synchronous operation mode, an arithmetic operation for estimating a value proportionate to a torque of said permanent magnet motor is conducted, a control constant concerning an automatic speed regulator, said current regulators or said voltage command value generator is set on the basis of the value proportionate to the torque of said permanent magnet motor, and a shift to the operation mode using position feedback is conducted, and
   thereby said permanent magnet motor is driven.

* * * * *